United States Patent
Stoop et al.

(10) Patent No.: US 10,083,379 B2
(45) Date of Patent: Sep. 25, 2018

(54) TRAINING IMAGE-RECOGNITION SYSTEMS BASED ON SEARCH QUERIES ON ONLINE SOCIAL NETWORKS

(71) Applicant: Facebook, Inc., Menlo Park, CA (US)

(72) Inventors: Dirk John Stoop, Menlo Park, CA (US); Balmanohar Paluri, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 88 days.

(21) Appl. No.: 15/277,950

(22) Filed: Sep. 27, 2016

(65) Prior Publication Data

US 2018/0089542 A1    Mar. 29, 2018

(51) Int. Cl.
| | |
|---|---|
| *G06K 9/22* | (2006.01) |
| *G06K 9/66* | (2006.01) |
| *G06F 17/30* | (2006.01) |
| *G06N 99/00* | (2010.01) |
| *G06K 9/62* | (2006.01) |
| *G06K 9/42* | (2006.01) |

(52) U.S. Cl.
CPC ......... *G06K 9/66* (2013.01); *G06F 17/30277* (2013.01); *G06K 9/42* (2013.01); *G06K 9/6277* (2013.01); *G06N 99/005* (2013.01)

(58) Field of Classification Search
USPC ....................................................... 382/159
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |
| 7,836,044 B2 | 11/2010 | Kamvar |
| 8,027,990 B1 | 9/2011 | Mysen |

(Continued)

OTHER PUBLICATIONS 2017-386395, May 2017, Derwent, Guo.*

(Continued)

*Primary Examiner* — Jerome Grant, II
(74) *Attorney, Agent, or Firm* — Baker Botts L.L.P.

(57) ABSTRACT

In one embodiment, a method includes receiving a plurality of search queries comprising n-grams; identifying a subset of the plurality of search queries as being queries for visual-media items based on one or more n-grams of the search query being associated with visual-media content; calculating, for each of the n-grams of the search queries of the subset, a popularity-score based on a count of the search queries in the subset that include the n-gram; determining popular n-grams, wherein each of the popular n-grams is an n-gram of the search queries of the subset of search queries having a popularity-score greater than a threshold popularity-score; and selecting one or more of the popular n-grams for training a visual-concept recognition system, wherein each of the popular n-grams is selected based on whether it is associated with a visual concept.

20 Claims, 8 Drawing Sheets

(56) References Cited

U.S. PATENT DOCUMENTS

| | | |
|---|---|---|
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,751,530 B1* | 6/2014 | Ioffe ............... G06F 17/30277 707/772 |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |

(56) References Cited

U.S. PATENT DOCUMENTS

| | | |
|---|---|---|
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0250109 A1* | 9/2014 | Wang ................. G06F 17/30247 707/723 |
| 2014/0280080 A1 | 9/2014 | Solheim |
| 2014/0304429 A1 | 10/2014 | Softky |
| 2015/0036919 A1 | 2/2015 | Bloom |
| 2015/0074289 A1 | 3/2015 | Hyman |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Chemiayskii |
| 2016/0203525 A1* | 7/2016 | Hara ................. G06Q 30/0271 705/14.56 |
| 2017/0004383 A1* | 1/2017 | Lin .................... G06F 17/30268 |
| 2017/0220677 A1* | 8/2017 | Kazi ................. G06F 17/30684 |
| 2017/0270122 A1* | 9/2017 | He .................... G06F 17/30554 |
| 2017/0351709 A1* | 12/2017 | Kong ................ G06F 17/30268 |

OTHER PUBLICATIONS

U.S. Appl. No. 14/983,385, filed Dec. 29, 2015, Nikhil Johri.

U.S. Appl. No. 15/277,938, filed Sep. 27, 2016, Dirk John Stoop.

Schroff et al., FaceNet: A Unified Embedding for Face Recognition and Clustering, Jul. 17, 2015.

Pedro O. Pinheiro et al., Facebook AI Research, Learning to Segment Object Candidates, 28 Neural Information Processing Systems, Sep. 1, 2015.

Armaund Joulin et al., Facebook AI Research, Learning Visual Features from Large Weakly Supervised Data, Nov. 6, 2015.

Pedro O. Pinheiro et al., Facebook AI Research, Learning to Refine Object Segments, European Conference on Computer Vision, Jul. 26, 2016.

* cited by examiner

FIG. 4

TRAINING IMAGE-RECOGNITION SYSTEMS BASED ON SEARCH QUERIES ON ONLINE SOCIAL NETWORKS

TECHNICAL FIELD

This disclosure generally relates to social graphs and object search within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

When users search for visual-media items, they often attempt to search for visual concepts (i.e., distinct concepts that may be visually perceived and recognized by human users in images, such as objects or persons) within the visual-media items by constructing search queries that describe the visual concepts. Constructing search queries in this manner may be intuitive to users, but may be difficult for a computing system to resolve. One problem that arises with such search queries is the identifying of visual concepts in visual-media items, which can be particularly difficult without human input. Classifying them may be even more difficult, such that identifying visual-media items responsive to a search query that attempts to describe visual concepts in visual-media items presents a significant challenge. Some current methods simply use a limited—and often noisy—pool of text sources (e.g., text from the title, description, comments, reshares, other linked content, etc.) that may be associated with visual-media items but may do a poor job of describing the important visual concepts within visual-media items—i.e., the visual concepts that users may actually search for when attempting to access visual-media items. Additionally, the text that users associate with the visual concepts they intend to search for, and consequently the text that they use in constructing the corresponding search queries, may be difficult to determine. As an example and not by way of limitation, users may construct search queries with slang terms that are intended to refer to visual concepts, and these slang terms may be constantly evolving such that a fixed set of keywords for visual concepts may not be ideal in handling search queries for these visual concepts. The methods described herein attempt to solve these technical challenges associated with searching for visual-media items by using an image-recognition process to segment images of visual-media items and identify visual concepts therein and by then tying those visual concepts to text supplied by user communications, where the text is determined to be likely to describe those visual concepts. The described joint embedding model may be advantageous in that it allows the social-networking system to leverage what is effectively crowdsourced information from text associated with visual-media items (e.g., from communications, metadata, etc.) to determine associations between n-grams and visual-media items, and ultimately between n-grams and visual concepts. In this way, the social-networking system may be able to describe visual concepts based on the n-grams that are associated with the visual concepts. This method of describing visual concepts may be more efficient than other solutions in that it uses a large amount of existing information (e.g., information from communications on the social-networking system or other information sourced from a large number of users) to train a visual-concept recognition system and describe concepts appearing in visual-media items, rather than resorting to more processor- and labor-intensive efforts that may be required in training a system to classify concepts in visual-media items. The technical benefit of this training may be the ability to index visual concepts with n-grams that users associate with those visual concepts, and ultimately, the ability to efficiently return high-quality search results to search queries directed at indexed visual concepts. The described training process may have the ability to be language-agnostic, which has the technical benefit of not requiring a semantic understanding of visual concepts of visual-media items and may thereby reduce the complexities of processing such information. The language-agnostic nature may also allow for the training process to function seamlessly across various languages, so long as associations can be made between n-grams and visual concepts (or visual media-items).

In particular embodiments, the social-networking system may identify a shared visual concept in two or more visual-media items. Each visual-media item may include visual concepts in one or more of its images that may be identified based on visual features in the images. A shared visual concept may be identified in two or more videos based on one or more shared visual features in the respective images of the visual-media items. The social-networking system may extract, for each of the visual-media items, one or more n-grams from one or more communications associated with the visual-media item. In particular embodiments, the social-networking system may generate, in a d-dimensional space, an embedding for each of the visual-media items, wherein a location of the embedding for the visual-media item is based on the one or more visual concepts included in the visual-media item. The social-networking system may generate, in the d-dimensional space, an embedding for each of the extracted n-grams, wherein a location of the embedding for the n-gram is based on a frequency of occurrence of the n-gram in the communications associated with the visual-media items. The social-networking system may associate, with the shared visual concept, one or more of the extracted n-grams that have embeddings within a threshold area of the embeddings for the identified visual-media items. Although the disclosure focuses on visual-media items, it contemplates applying the disclosed methods to other types of media such as audio (e.g., using an audio-recognition process rather than an image-recognition process). Furthermore, although the disclosure focuses on extracting n-grams from communications, it contemplates extracting n-grams or other suitable units of information from other sources.

The extensive and continuous nature of the training of n-grams to visual-media items and visual concepts as described herein may introduce several challenges for the social-networking system. First, the social-networking system may only be able train for a finite number of visual concepts within a given period of time, such that the social-networking system may be unable to be trained for every possible visual concept. Second, new visual concepts and n-grams describing them may constantly be emerging and the social-networking system may need to be able to train for these visual concepts as they emerge and become important to the user base. As an example and not by way of limitation, the n-gram "smartphone" and its associated visual concept may not have existed before the first smartphone was released, such that the requisite associations may not have yet been trained for. The methods described herein attempt to solve problems such as these by using search-query metrics that describe what n-grams are popularly searched for, and by extension, what visual concepts are popularly searched for, to strategically select the visual concepts and n-grams to train for. The social-networking system may use search-query metrics to determine what n-grams are popular in search queries submitted by users (e.g., n-grams used in a threshold number of queries) and may then train those n-grams to their respective visual concepts if they have not already been trained for. The social-networking system may train these popular n-grams to their respective visual concepts using any suitable method such as the ones described here (e.g., by mapping these n-grams onto n-embeddings in the joint embedding model). As an example and not by way of limitation, if users are frequently submitting search queries that include the n-gram "batman" and if the social-networking system has not associated that n-gram with a visual concept, the social-networking system may select that n-gram for training. Selecting visual concepts and n-grams strategically in this manner may provide the technical benefit of improving the efficiency of training a visual-concept recognition system by training for visual concepts and n-grams that are relevant to a search functionality. It further ensures that the social-networking system trains for the most up-to-date visual concepts.

In particular embodiments, the social-networking system may receive, from a plurality of client systems of a plurality of users, a plurality of search queries. Each of the search queries may include one or more n-grams. The social-networking system may identify a subset of search queries from the plurality of search queries as being queries for visual-media items. The social-networking system may determine that a search query is a query for visual-media items based on one or more n-grams of the search query being associated with visual-media content. The social-networking system may calculate, for each of the n-grams of the search queries of the subset of search queries, a popularity-score. The popularity-score may be based on a count of the search queries in the subset of search queries that include the n-gram. The social-networking system may determine one or more popular n-grams based on the n-grams of the search queries of the subset of search queries. The popular n-grams may be n-grams of the search queries of the subset of search queries having a popularity-score greater than a threshold popularity-score. The social-networking system may select one or more of the popular n-grams for training a visual-concept recognition system. Each of these popular n-grams may be selected based on whether it is associated with one or more visual concepts. As an example and not by way of limitation, the social-networking system may forgo the selection of a popular n-gram if it determines that the popular n-gram is already associated with one or more visual concepts.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates example communications associated with a visual-media item.

DESCRIPTION OF EXAMPLE EMBODIMENTS

System Overview

Figure 1:
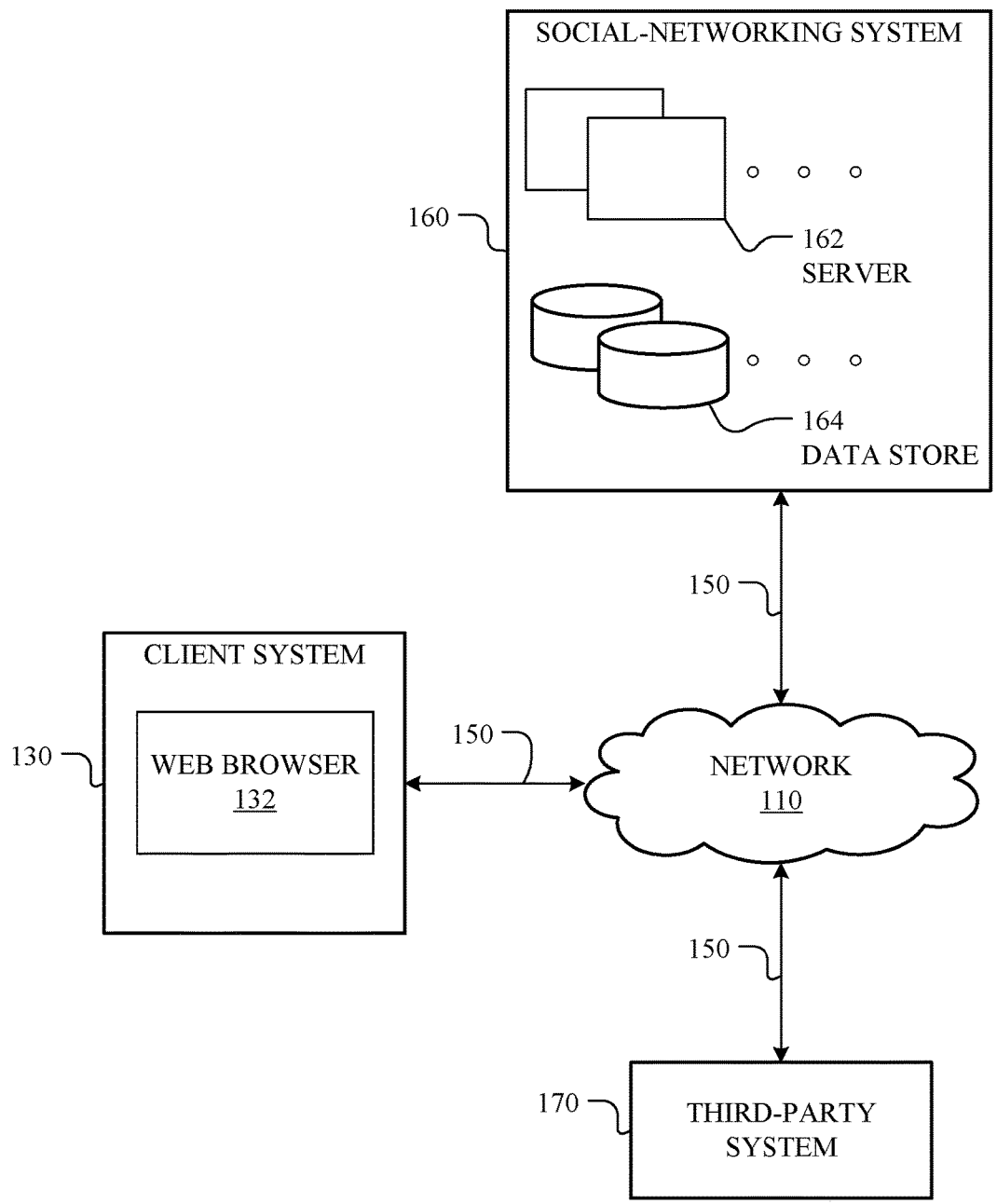
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
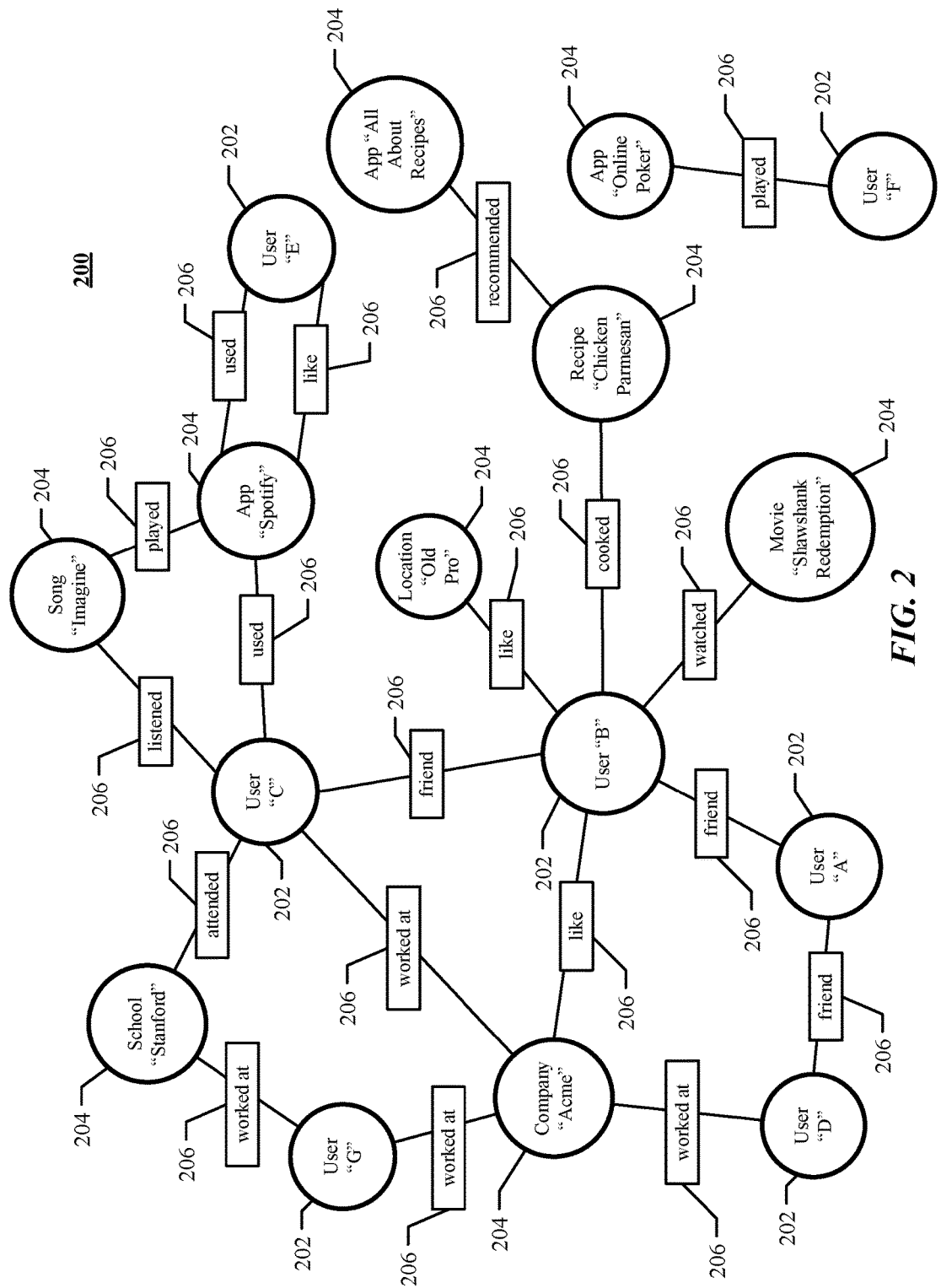
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a social-graph concept. As an example and not by way of limitation, a social-graph concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable social-graph concept; or two or more such social-graph concepts. A concept node 204 may be associated with information of a social-graph concept provided by a user or information gathered by various systems, including the social-networking system 160. As an example and not by way of limitation, information of a social-graph concept may include a name or a title; one or more images (e.g., an image of the cover page of a book); a location (e.g., an address or a geographical location); a website (which may be associated with a URL); contact information (e.g., a phone number or an email address); other suitable social-graph concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the social-graph concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or social-graph concepts as being connected. Herein, references to users or social-graph concepts being connected may, where appropriate, refer to the nodes corresponding to those users or social-graph concepts being connected in the social graph 200 by one or more edges 206.

In particular embodiments, an edge 206 between a user node 202 and a concept node 204 may represent a particular action or activity performed by a user associated with user node 202 toward a social-graph concept associated with a concept node 204. As an example and not by way of limitation, as illustrated in FIG. 2, a user may "like," "attended," "played," "listened," "cooked," "worked at," or "watched" a social-graph concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular social-graph concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the social-graph concept represented by the concept node 204 by clicking or selecting a "Like" icon, which may cause the user's client system 130 to send to the social-networking system 160 a message indicating the user's liking of the social-graph concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those social-graph concepts. Although this disclosure describes forming particular edges 206 in particular manners, this disclosure contemplates forming any suitable edges 206 in any suitable manner. Although this disclosure focuses on concept nodes corresponding to social-graph concepts, it also contemplates concept nodes corresponding to visual concepts.

Search Queries on Online Social Networks

In particular embodiments, a user may submit a query to the social-networking system 160 by, for example, selecting a query input or inputting text into query field. A user of an online social network may search for information relating to a specific subject matter (e.g., users, social-graph concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, social-graph concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or social-graph concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, each of which is incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or social-graph concept name corresponding to the selected node, or to search for users or social-graph concepts connected to the matched users or social-graph concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, each of which is incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Training Image-Recognition Systems Using a Joint Embedding Model

When users search for visual-media items, they often attempt to search for visual concepts (i.e., distinct concepts that may be visually perceived and recognized by human users in images, such as objects or persons) within the visual-media items by constructing search queries that describe the visual concepts. Constructing search queries in this manner may be intuitive to users, but may be difficult for a computing system to resolve. One problem that arises with such search queries is the identifying of visual concepts in visual-media items, which can be particularly difficult without human input. Classifying them may be even more difficult, such that identifying visual-media items responsive to a search query that attempts to describe visual concepts in visual-media items presents a significant challenge. Some current methods simply use a limited—and often noisy—pool of text sources (e.g., text from the title, description, comments, reshares, other linked content, etc.) that may be associated with visual-media items but may do a poor job of describing the important visual concepts within visual-media items—i.e., the visual concepts that users may actually search for when attempting to access visual-media items. Additionally, the text that users associate with the visual concepts they intend to search for, and consequently the text that they use in constructing the corresponding search queries, may be difficult to determine. As an example and not by way of limitation, users may construct search queries with slang terms that are intended to refer to visual concepts, and these slang terms may be constantly evolving such that a fixed set of keywords for visual concepts may not be ideal in handling search queries for these visual concepts. The methods described herein attempt to solve these technical challenges associated with searching for visual-media items by using an image-recognition process to segment images of visual-media items and identify visual concepts therein and by then tying those visual concepts to text supplied by user communications, where the text is determined to be likely to describe those visual concepts. The described joint embedding model may be advantageous in that it allows the social-networking system 160 to leverage what is effectively crowdsourced information from text associated with visual-media items (e.g., from communications, metadata, etc.) to determine associations between n-grams and visual-media items, and ultimately between n-grams and visual concepts. In this way, the social-networking system 160 may be able to describe visual concepts based on the n-grams that are associated with the visual concepts. This method of describing visual concepts may be more efficient than other solutions in that it uses a large amount of existing information (e.g., information from communications on the social-networking system 160 or other information sourced from a large number of users) to train a visual-concept recognition system and describe concepts appearing in visual-media items, rather than resorting to more processor- and labor-intensive efforts that may be required in training a system to classify concepts in visual-media items. The technical benefit of this training may be the ability to index visual concepts with n-grams that users associate with those visual concepts, and ultimately, the ability to efficiently return high-quality search results to search queries directed at indexed visual concepts. The described training process may have the ability to be language-agnostic, which has the technical benefit of not requiring a semantic understanding of visual concepts of visual-media items and may thereby reduce the complexities of processing such information. The language-agnostic nature may also allow for the training process to function seamlessly across various languages, so long as associations can be made between n-grams and visual concepts (or visual media-items).

In particular embodiments, the social-networking system 160 may identify a shared visual concept in two or more visual-media items. Each visual-media item may include visual concepts in one or more of its images that may be identified based on visual features in the images. A shared visual concept may be identified in two or more videos based on one or more shared visual features in the respective images of the visual-media items. The social-networking system 160 may extract, for each of the visual-media items, one or more n-grams from one or more communications associated with the visual-media item. In particular embodiments, the social-networking system 160 may generate, in a d-dimensional space, an embedding for each of the visual-media items, wherein a location of the embedding for the visual-media item is based on the one or more visual concepts included in the visual-media item. The social-networking system 160 may generate, in the d-dimensional space, an embedding for each of the extracted n-grams, wherein a location of the embedding for the n-gram is based on a frequency of occurrence of the n-gram in the communications associated with the visual-media items. The social-networking system 160 may associate, with the shared visual concept, one or more of the extracted n-grams that have embeddings within a threshold area of the embeddings for the identified visual-media items. Although the disclosure focuses on visual-media items, it contemplates applying the disclosed methods to other types of media such as audio (e.g., using an audio-recognition process rather than an image-recognition process). Furthermore, although the disclosure focuses on extracting n-grams from communications, it contemplates extracting n-grams or other suitable units of information from other sources.

In particular embodiments, the social-networking system 160 may perform an image-analysis process on visual-media items to identify one or more visual features present in the visual-media items. A visual-media item may be a content item that includes one or more images (e.g., a video, a photo, an image file such as a GIF or JPEG, an emoji, etc.), each image including one or more visual features. The images may include one or more visual features, which may be visual descriptors of the images (e.g., color, shape, regions, textures, location, motion). Each visual-media item may include one or more visual concepts (which may correspond to depictions of objects such as a face) that may be identified based on the visual features detected in images or a sequence of images (e.g., based on an image-segmentation algorithm that partitions an image into segments based on visual features).

In particular embodiments, the social-networking system 160 may perform an image-analysis process on one or more visual-media items to identify one or more visual features present in the visual-media items. The visual features of an image may be visual descriptors of the image. That is, the visual features of an image may be a qualitative description of distinct characteristics of the image that may be visually perceived (e.g., by a human viewing the image). As an example and not by way of limitation, visual features may describe such information as color, shape, regions, textures, and location (e.g., of identified shapes in the image). In particular embodiments, the visual-media item may also include visual features based on a sequence of images. As an example and not by way of limitation, a visual-media item may include motion as a visual feature (e.g., describing what appears to be the motion of one or more objects apparently common to a sequence of images of the visual-media item). In particular embodiments, any suitable feature-detection algorithms or techniques may be used to detect visual features present in images of the visual-media item. As an example and not by way of limitation, a feature-detection algorithm may identify shapes by evaluating the pixels of an image for the presence of image-edges (e.g., sets of points in an image that have a strong gradient magnitude), corners (e.g., sets of points with low levels of curvature), blogs (relatively smooth areas), and/or ridges.

Figure 3B:
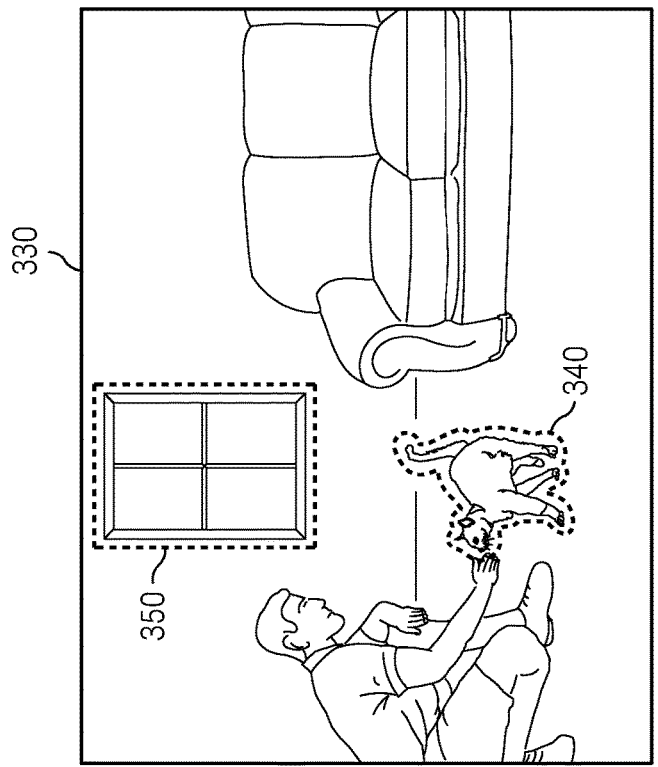
FIGS. 3A and 3B illustrate two example representations of two different visual-media items.
Figure 3A:
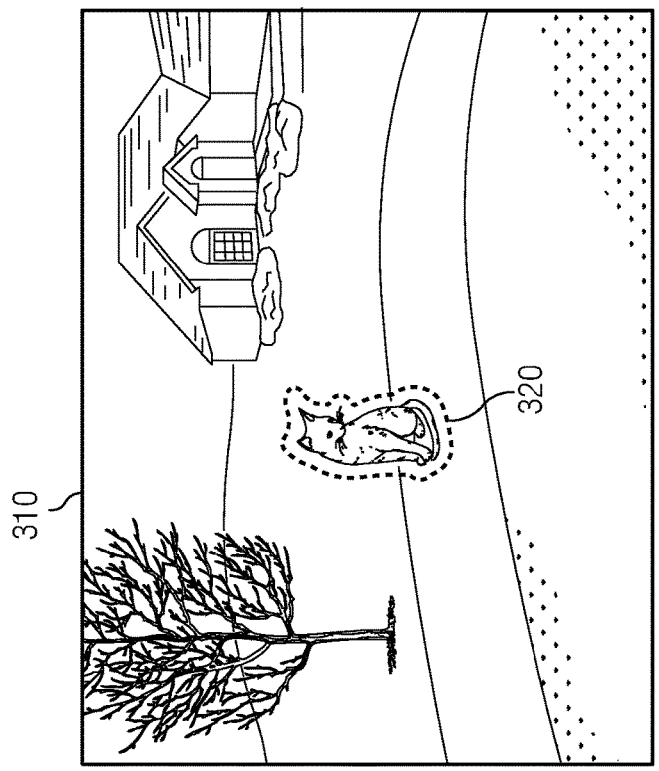

FIGS. 3A and 3B illustrate two example representations of two different visual-media items. Each representation may be an image of the respective visual-media item. Each visual-media item may include one or more visual concepts that may be depicted in the images of the visual-media item. Visual concepts may correspond to higher-level characteristics of an image or a sequence of images in a visual-media item that describe distinct, identifiable concepts that would be recognizable as distinct concepts to a human. As an example and not by way of limitation, visual concepts may correspond to depictions of objects that appear in an image (e.g., a face of a particular person, a car) or depictions of concepts expressed by a sequence of images (e.g., a swinging pendulum in a sequence of images). The social-networking system 160 may identify visual concepts by an image-segmentation algorithm that partitions an image into one or more segments, at least one of which may correspond to a set of pixels that corresponds to a depiction of a visual concept. The image-segmentation algorithm may partition an image into segments by grouping sets of pixels together based on visual features of the image. In doing so, the image-segmentation algorithm may use the visual features as cues to determine sets of pixels that may correspond to a depiction of a visual concept. As an example and not by way of limitation, referencing FIG. 3A, the image-segmentation algorithm may partition the image 310 into multiple segments, including the segment 320 (e.g., corresponding to a visual concept that a human may recognize as a depiction of a cat) based on factors such as colors, shapes, and textures that suggest a region boundary defined by the segment 320. One method of partitioning an image into segments may involve the use of one or more deep-learning models (e.g., a convolutional neural network) that divides the image into one or more patches and then analyzes the image on a patch-by-patch basis. As an example and not by way of limitation, each patch may be a fixed region that is 200×200 pixels. In this example, the system may generate, in relation to a first patch, a second overlapping patch by shifting the location of the patch by a fixed amount of pixels (e.g., a 16-pixel shift) in any suitable direction. This may be repeated to cover the whole image. Each patch is analyzed by determining whether or not the patch contains one or more objects using visual features of the patch. A deep-learning model may then determine whether each pixel in the patch is part of a central object in the patch, and whether the patch contains an object roughly centered in the patch. Additionally, a deep-learning model may determine if the object is fully contained in the patch and in a given scale range. After similar analyses on each patch in the image, including overlapping patches, a deep-learning model may partition the image into segments. In particular embodiments, the social-networking system 160 may then shrink the image by a factor of $$2^{\frac{1}{2}},$$

run the 16-pixel shifted windows of the down-sized image through the image through the deep-learning model to obtain additional object proposals for the image. The social-networking system 160 may then shrink the object by another factor of $$2^{\frac{1}{2}},$$

to get an image that is half the size of the original image (e.g., 100×100 pixels) and may run the 16-pixel shifted windows of the 100-pixel image through the deep-learning model to obtain additional object proposals for the image. This sliding and scaling window approach ensures that the system is able to generate object proposals for objects at different positions in the image and for objects of different sizes. In particular embodiments, the social-networking system 160 may use enough differently-located and sized patches of an image so that for each object in the image, at least one patch is run through the system that fully contains the object (i.e., roughly centered and at the appropriate scale). In particular embodiments, the system may include three convolutional neural networks. As shown in the illustrated embodiment of FIG. 5, the system may have a first, feature-extraction convolutional neural network that may take as inputs patches of images and output features of the patch/image (i.e., any number of features detected in the image). The feature-extraction layers may be pre-trained to perform classification on the image. The feature-extraction model may be fine-tuned for object proposals during training of the system. As an example and not by way of limitation, the feature-extraction layers may consist of eight 3×3 convolutional layers and five 2×2 max-pooling layers. As an example and not by way of limitation, the feature-extraction layers may take an input image of dimension 3×h×w, and the output may be a feature map of dimensions $$512 \times \frac{h}{16} \times \frac{w}{16}.$$

More information on partitioning images into segments may be found in the following, each of which is incorporated by reference: Pedro O. Pinheiro et al., Learning to Segment Object Candidates, 28 Neural Information Processing Systems, Sep. 1, 2015; and Pedro O. Pinheiro et al., Learning to Refine Object Segments, European Conference on Computer Vision, Jul. 26, 2016.

In particular embodiments, the social-networking system 160 may identify a shared visual concept in two or more visual-media items. The social-networking system 160 may do so by comparing visual features of pixels (or groups of pixels) of segments of images (which may correspond to visual concepts) of different visual-media items. Segments having greater than a threshold degree of similarity in their visual features may be determined to correspond to a depiction of a shared visual concept. As an example and not by way of limitation, referencing FIGS. 3A and 3B, the social-networking system 160 may identify a shared visual concept depicted in visual-media items (e.g., an image of a video, a photo image) 310 and 330 in the segments 320 and 340. In particular embodiments, a particular visual concept may be defined by one or more of the visual features associated with the visual concept. This definition may constantly be refining and evolving as the social-networking system 160 identifies more and more visual-media items with segments determined to correspond to the particular visual concept (e.g., by identifying visual-media items with segments having greater than a threshold degree of similarity). In particular embodiments, the social-networking system 160 may not need to have a semantic understanding of what any particular visual concept is. Rather, the visual concept may be defined by its associated visual features, determined based on some or all of the visual-media items that were identified as having the visual concept. As an example and not by way of limitation, referencing FIGS. 3A and 3B, the social-networking system 160 may not need to understand that the visual concepts depicted by segments 320 and 340 correspond to cats. In this example, the social-networking system 160 may simply recognize that both segments have a threshold degree of similarity in visual features (e.g., based on shape, texture, color) so as to be identified as a shared visual concept. By not requiring a semantic understanding of visual concepts, the social-networking system 160 may conserve time and resources using the methods described herein. Although this disclosure describes identifying particular visual concepts in a particular manner, it contemplates identifying any suitable concepts in any suitable manner.

Figure 4:
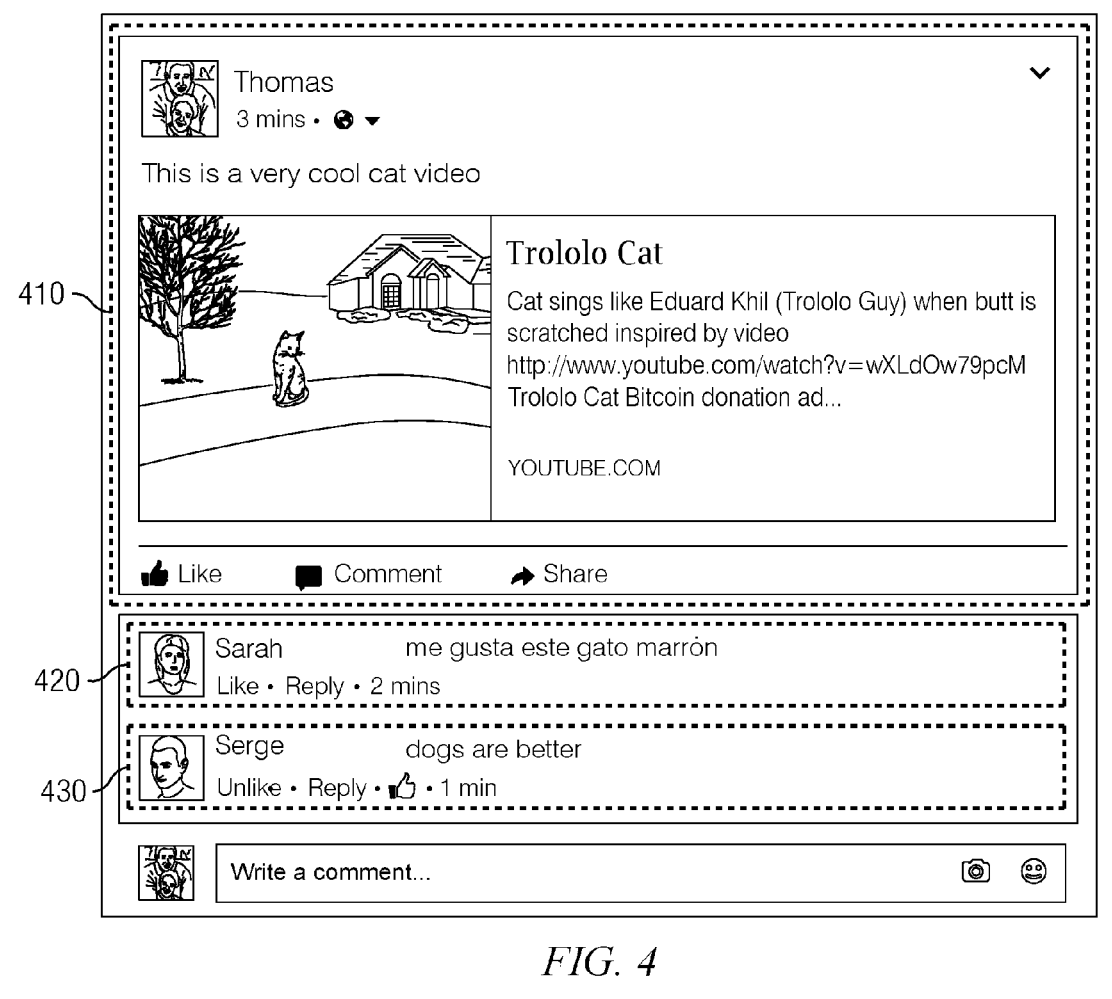

FIG. 4 illustrates example communications associated with a visual-media item. In particular embodiments, the social-networking system 160 may extract, for each of the visual-media items, one or more n-grams from one or more communications associated with the visual-media item. In general, an n-gram may be a contiguous sequence of n items from a given sequence of text. The items may be characters, phonemes, syllables, letters, words, base pairs, prefixes, or other identifiable items from the sequence of text or speech. An n-gram may include one or more characters of text (letters, numbers, punctuation, etc.) in the content of a post or the metadata associated with the post. In particular embodiments, each n-gram may include a character string (e.g., one or more characters of text). In particular embodiments, an n-gram may include more than one word. For purposes of this disclosure, communications may be associated with a visual-media item if it includes the visual-media item or if it is otherwise related to a visual-media item. As an example and not by way of limitation, the communications may be communications on the online social network, such as comments, posts, or reshares, that include the visual-media item (e.g., as a content object within a communication). As an example and not by way of limitation, the communications may include a reference to the visual-media item. In this example, the reference may be a direct reference (e.g., a link) to the visual-media item or may be an implicit reference to the visual-media item (e.g., a comment to a post that includes a link to a visual-media item). In particular embodiments, not all n-grams of a communication may be extracted. The social-networking system 160 may parse the text of the communication to identify one or more n-grams that may be extracted by the social-networking system 160. In particular embodiments, the social-networking system 160 may make use of a Natural Language Processing (NLP) analysis in parsing through the text of the communication to identify the n-grams. As an example and not by way of limitation, referencing FIG. 4, the social-networking system 160 may parse some or all of the text of the post 410 (e.g., "this is a very cool cat video") to identify n-grams that may be extracted. The social-networking system 160 may identify, among others, the following n-grams: cat; video; cat video. The social-networking system 160 may also parse through metadata associated with a visual-media item. As an example and not by way of limitation, the social-networking system 160 may parse through a filename, creator information, or other suitable information associated with the metadata. The social-networking system 160 may also parse through text directly associated with the visual-media item such as the description and/or title of the visual-media item linked in the post 410 to identify, among others, the following n-grams: trololo cat; cat sings; eduard khil; cat sings like eduard khil; butt; butt is scratched. In particular embodiments, the social-networking system 160 may perform one or more suitable pre-processing steps, such as removing certain numbers and punctuation (including the "#" character in a hashtagged term), removing or replacing special characters and accents, lower-casing all text, other suitable pre-processing steps, or any combination thereof. In particular embodiments, the social-networking system 160 may use a term frequency-inverse document frequency (TF-IDF) analysis to remove insignificant terms from the search query. The TF-IDF is a statistical measure used to evaluate how important a term is to a document (e.g., a particular communication on the online social network that is associated with one or more visual-media items) in a collection or corpus (e.g., a set of communications on the online social network that include one or more visual-media items). The less important a term is in the collection or corpus, the less likely it may be that the term will be extracted as an n-gram. The importance increases proportionally to the number of times a term appears in a particular document, but is offset by the frequency of the term in the corpus of documents. The importance of a term in a particular document is based in part on the term count in a document, which is simply the number of times a given term (e.g., a word) appears in the document. This count may be normalized to prevent a bias towards longer documents (which may have a higher term count regardless of the actual importance of that term in the document) and to give a measure of the importance of the term t within the particular document d. Thus we have the term frequency tf(t,d), defined in the simplest case as the occurrence count of a term t in a document d. The inverse-document frequency (idf) is a measure of the general importance of the term which is obtained by dividing the total number of documents by the number of documents containing the term, and then taking the logarithm of that quotient. A high weight in TF-IDF is reached by a high term frequency in the given document and a low document frequency of the term in the whole collection of documents; the weights hence tend to filter out common terms. As an example and not by way of limitation, referencing FIG. 4, a TF-IDF analysis of the text of the post 410 (e.g., "this is a very cool cat video") may determine that the n-gram "cat" should be extracted as an n-gram, where this term have high importance within the post. Similarly, a TF-IDF analysis of the text in the post may determine that the n-grams "this," "is," and "a" should not be extracted as n-grams, where these terms have a low importance within the post (e.g., because it may be a common term in many communications on the online social network that include visual-media items or in titles or descriptions of visual-media items, and therefore may not help narrow the set of search results in any nontrivial manner). More information on determining term importance may be found in U.S. patent application Ser. No. 14/877,624, filed 7 Oct. 2015, which is incorporated by reference. In particular embodiments, the social-networking system 160 may filter out non-descriptive n-grams (i.e., n-grams that are unlikely to be descriptors of visual concepts). This filtering process may be based on a pre-generated list of non-descriptive n-grams. As an example and not by way of limitation, the pre-generated list may include n-grams such as "throwback Thursday" (e.g., a term that may be used simply to signify that a visual-media item is from the past and may otherwise have nothing to do with any visual concepts in the visual-media item). The pre-generated list may be curated or may be populated using a suitable machine-learning process. In particular embodiments, the social-networking system 160 may translate media items (e.g., emojis, photos, audio files, etc.) that are within the communications to n-grams using a video index or other media index, as described in U.S. patent application Ser. No. 14/952,707, filed 25 Nov. 2015, which is incorporated by reference. After one or more of these processes are performed, the social-networking system 160 may be left with a set of n-grams that are likely to be descriptors of a visual concept. In particular embodiments, it is only this set of n-grams that is "extracted" for the purposes of this disclosure. Although this disclosure describes extracting n-grams from particular sources in a particular manner, it contemplates extracting any suitable unit of information from any suitable sources in any suitable manner.

Figure 5:
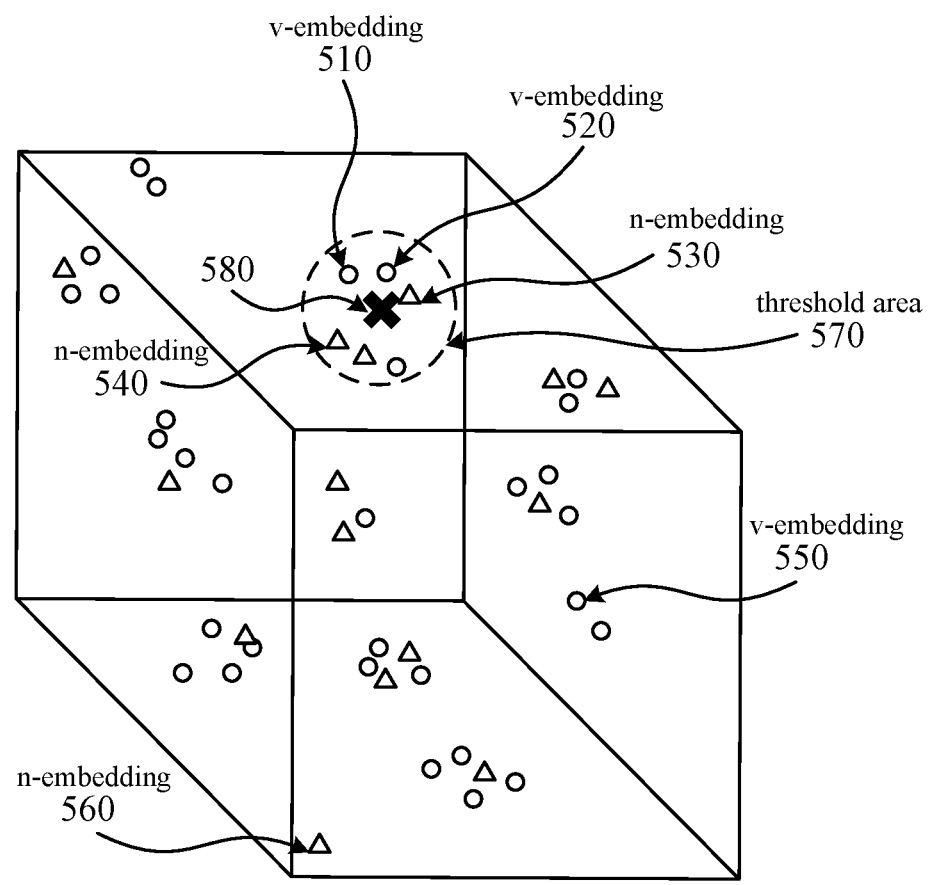
FIG. 5 illustrates an example view of an embedding space.

FIG. 5 illustrates an example view of an embedding space 500. In particular embodiments, the social-networking system 160 may generate, in a d-dimensional space, an embedding for each of the visual-media items. The location of the embedding for the visual-media item may be based on the one or more visual concepts included in the visual-media item. Within this disclosure, embeddings for visual-media items will be termed "v-embeddings," merely to avoid confusion with embeddings for n-grams (as described herein), which will be termed "n-embeddings." While they are termed differently, within the d-dimensional space, they may behave the same way and only differ in the sense that they correspond to different types of information (i.e., v-embeddings correspond to visual-media items, while n-embeddings correspond to n-grams). Although the embedding space 500 is illustrated as a three-dimensional space, it will be understood that this is for illustrative purposes only. The embedding space 500 may be of any suitable dimension. In particular embodiments, the social-networking system 160 may, at any suitable time (e.g., upon upload of a visual-media item or the posting of a communication referencing a visual-media item, or shortly thereafter), map a visual-media item to the embedding space 500 as a vector representation (e.g., a d-dimensional vector). As an example of mapping a visual-media item to an embedding space, referencing FIG. 4, when the post 410 is first posted, the social-networking system 160 may map the visual-media item onto a vector using a deep-learning model (e.g., a convolutional neural network) based on information associated with the visual-media item. The deep-learning model may have been trained using a sequence of training data (e.g., a corpus of images from videos or photos on the online social network). The vector representation may be based on one or more visual features or visual concepts associated with the visual-media item, and may be a symbolic representation of the visual features or visual concepts. In particular embodiments, a visual-media item may have multiple embeddings to account for different visual concepts included in the visual-media item. As an example and not by way of limitation, referencing FIGS. 3A and 3B, the visual-media item 310 may have a v-embedding that is based on the segment 340 (e.g., depicting a visual concept that may be recognized by a human as a cat) and a separate v-embedding that is based on the segment 350 (e.g., depicting a visual concept that may be recognized by a human as a window). In this way, the same visual-media item may be used by the social-networking system 160 in identifying multiple visual concepts and associating n-grams that may be descriptors of the multiple visual concepts. Although this disclosure describes generating particular embeddings in a particular manner, it contemplates generating any suitable embedding in any suitable manner.

In particular embodiments, the different visual features of the visual concepts associated with a visual-media item may determine the properties (e.g., magnitude, direction) of its respective vector in the d-dimensional space. As an example and not by way of limitation, referencing FIGS. 3A and 3B, the vector of the visual-media item 310 may be based on visual features of the visual concept depicted in the segment 320 and the vector of the visual-media item 330 may be based on the visual features of the visual concept depicted in the segment 340. The vector may provide coordinates corresponding to a particular point (e.g., the terminal point of the vector) in an embedding space. The particular point may be an "embedding" for the respective visual-media item. As an example and not by way of limitation, referencing FIG. 5, the v-embedding 510 may be a coordinate of a terminal point of a vector representation of a first visual-media item and the v-embedding 520 may be a coordinate of a terminal point of a vector representation of a second visual-media item. The location of each v-embedding may be used to describe the visual concepts associated with a respective visual-media item. In particular embodiments, since the vector representations of visual-media items, and therefore their respective embeddings, are based on the visual features of the visual concepts associated with the visual-media items, visual-media items that share visual concepts may be located relatively close to each other. By contrast, embeddings of visual-media items that do not share such concepts may be located relatively far apart from each other. As an example and not by way of limitation, referencing FIGS. 3A, 3B, and 5, the v-embedding 510 may correspond to the visual-media item 310, and the v-embedding 520 may correspond to the visual-media item 330, because they share at least one visual concept (e.g., depicted in the segments 320 and 340). By way of a contrasting example and not by way of limitation, the v-embedding 540 may correspond to a visual-media item of a car that does not include a visual concept with visual features similar to those in the visual-media items 310 and 330. This trait of the embeddings in the d-dimensional space may group visual-media items that share visual concepts closer together, and may effectively be used to demarcate areas in the d-dimensional space that are associated with particular visual concepts, as further described herein.

In particular embodiments, the properties of a vector representation may also be based on an image-recognition process (e.g., running natively on the social-networking system 160, running on a third-party system 170) that determines social-graph concepts (i.e., concepts represented by concept nodes 204 of the social graph 200) associated with the visual-media item. This association may provide an additional clue as to what a respective visual concept may be by effectively functioning as an additional descriptor of the visual concept. In particular embodiments, the image-recognition process may identify the visual features of the video and associate them with one or more social-graph concepts. As an example and not by way of limitation, referencing FIG. 4, the social-networking system 160 may identify visual features (e.g., shape, color, texture) in the visual-media item associated with the post 410 and may determine, based on an image-recognition process that uses the visual features as inputs, that the visual-media item is associated with the social-graph concept "Cat." More information on determining social-graph concepts in images may be found in U.S. patent application Ser. No. 13/959,446, filed 5 Aug. 2013, and U.S. patent application Ser. No. 14/983,385, filed 29 Dec. 2015, each of which is incorporated by reference. In particular embodiments, the social-graph concepts may be determined based on associations between a context associated with visual-media items and one or more social-graph concepts. As an example and not by way of limitation, a visual-media item posted on a page or interface related to the social-graph concept "Batman" may be associated with that social-graph concept. In particular embodiments, social-graph concepts may be determined based on one or more audio features of a visual-media item. As an example and not by way of limitation, a speech-recognition process may recognize the word "cat" being spoken by a person in the visual-media item associated with the post 410, in which case, the social-networking system 160 may associate the visual-media item with the social-graph concept "Cat." As another example and not by way of limitation, a voice-recognition process may recognize the voice of a particular person (e.g., a user, a celebrity) and associate the visual-media item with a social-graph concept that describes that person (e.g., the social-graph concept that corresponds directly to the user or the celebrity). As another example and not by way of limitation, an audio-recognition process may detect that the visual-media item associated with the post 410 includes a song by the artist Cat Stevens, in which case the social-networking system 160 may associate the visual-media item with the social-graph concept "Cat Stevens." In particular embodiments, associated social-graph concepts may be determined based on text associated with the video. As an example and not by way of limitation, the text may have been extracted from communications associated with the visual-media item. As another example and not by way of limitation, the text may have been extracted from metadata (e.g., the filename, time and location of upload, etc.) associated with the visual-media item or text directly associated with the visual-media item (e.g., the title, a description, etc.). In these examples, the social-networking system 160 may determine associated social-graph concepts by using a topic index to match the extracted text with keywords indexed with respective social-graph concepts, and may determine the vector representation based on these concepts. More information on using a topic index to determine concepts associated with text may be found in U.S. patent application Ser. No. 13/167,701, filed 23 Jun. 2011, and U.S. patent application Ser. No. 14/561,418, filed 5 Dec. 2014, each of which is incorporated by reference. In particular embodiments, associated social-graph concepts may be determined based on information associated with one or more users associated with the visual-media item. As an example and not by way of limitation, a visual-media item created by a user who with profile information indicating an interest in boxing may be associated with the social-graph concept "Boxing" or any other suitable concepts.

In particular embodiments, the social-networking system 160 may generate, in the d-dimensional space, an embedding for each of the extracted n-grams of communications or other sources, such as titles or descriptions, associated with visual-media items. As mentioned, these embeddings will be referred to herein as n-embeddings to avoid confusion. By embedding both n-grams and visual-media items in the same d-dimensional space, the social-networking system 160 creates what may be termed a "joint embedding model." In particular embodiments, the social-networking system 160 may generate n-embeddings just as it generates v-embeddings: by mapping n-grams to the embedding space 500 as vectors and then determining particular points of the vectors (e.g., the terminal points of the vectors) as embeddings for the respective vectors. In particular embodiments, the properties of the vector representations of n-embeddings may be based on a frequency of occurrence of the n-gram in the communications (or other sources) associated with the visual-media items. Essentially, this may be based on the idea that the text of communications associated with a visual-media item may include n-grams that describe visual concepts in the visual-media item. As an example and not by way of limitation, referencing FIG. 4, the post 410 and the comment 420, both being associated with the visual-media item referenced by the link, include the n-grams "cat" and "gato" (Spanish for the word "cat"). These n-grams may be describing a visual concept in the associated visual-media item, namely, the visual concept corresponding to what a human may perceive as a depiction of a cat. These n-grams may occur more frequently in communications associated with visual-media items including this visual concept (or, for example, in titles or descriptions of the visual-media items) than the n-gram "dog." While the n-gram "dog" may occur in some of these communications (e.g., as in the comment 430 in FIG. 4), in the aggregate, the overall occurrence of "dog" may be markedly less frequent than that of "cat" or "gato." The ability to associate n-grams of any language (be it English, Spanish, or any other language) with visual concepts and visual-media items illustrates just one of the technical improvement over prior processes of the particular language-agnostic training process described herein.

In particular embodiments, the social-networking system 160 may engage in a training phase that makes use of one or more training techniques to determine the locations of n-embeddings and v-embeddings in the d-dimensional space, and the n-grams that are associated with visual concepts based on these locations. In particular embodiments, the social-networking system 160 may train the joint embedding model using a triplet loss algorithm, which may analyze a large number (e.g., thousands, millions) of information triplets, each information triplet consisting of (1) a "triplet-query" (e.g., a media-item identifier that corresponds to a particular visual-media item including a particular visual concept), (2) a "positive" (e.g., an extracted n-gram that was used in greater than a threshold number of communications that included the particular visual-media item or another visual-media item having the particular visual concept), and (3) "a negative" (e.g., an extracted n-gram that was not used in a minimum number of communications that included the particular visual-media item or another visual-media item having the particular visual concept). As an example and not by way of limitation, with a triplet-query that corresponds to a visual-media item of a cat, the positive may be the n-gram "cat" (e.g., because it may have been used in greater than a threshold number of communications) and the negative may be the n-gram "dog" (e.g., because it may have been used in less than a minimum number of communications). In particular embodiments, the threshold number may be higher than the minimum number. As an example and not by way of limitation, the threshold number may be 1000 while the minimum number may be 10. Upon analyzing a large number of such triplets, the social-networking system 160 may map n-embeddings such that they are located relatively near v-embeddings of visual-media items for which the respective n-grams were positives and relatively far from visual-media items for which they were negatives. In particular embodiments, the relative distances may be based on (e.g., may be directly or indirectly proportional to) the frequency of occurrence. As an example and not by way of limitation, the n-embedding for the n-gram "dog" may be located closer that the word "canine" (another word that may be used to refer to dogs) to v-embeddings of visual-media items having the visual concept corresponding to what a human may perceive to be a dog (e.g., because "dog" may be used more frequently than "canine" in communications including these visual-media items). In particular embodiments, the distance between the embedding for each positive n-gram and the embedding for the particular visual-media item may be less than the distance between the embedding for each negative n-gram and the embedding for the particular visual-media item. The mappings may occur after a comprehensive analysis of the large number of triplets or may occur iteratively as the analysis is being performed. At the outset of this training phase, the social-networking system 160 may develop embeddings for a number of visual-media items and n-grams. As an example and not by way of limitation, referencing FIG. 5, the embedding space 500 includes a plurality of v-embeddings and n-embeddings, which may be based on the training process described herein. For example, the social-networking system 160 may compile the occurrences of the positive n-grams and the negative n-grams from information triplets for a particular visual-media item that includes a particular visual concept. The social-networking system 160 may then determine counts of each positive n-gram and negative n-gram, and may determine the locations of their respective n-embeddings based on the counts and based on the locations of the embeddings of the visual-media items that include the particular visual concept. As an example and not by way of limitation, n-embeddings of positive n-grams with relatively high counts may be located relatively close to the visual-media items. As another example and not by way of limitation, n-embeddings of negative n-grams with relatively high counts may be located relatively far from the visual-media items. In particular embodiments, the social-networking system 160 may also perform a softmax function process. This may occur before the triplet loss algorithm, which may provide added efficiency to the training process. The softmax function may examine individual extracted n-grams and associate them with visual concepts appearing in their respective visual-media items. In particular embodiments, the softmax function may only allow the association of one n-gram at a time for a particular instance of a visual-media item. As an example and not by way of limitation, referencing FIG. 4, for the instance of the visual-media item included in the post 410, the softmax function may only consider the n-gram "cat." In particular embodiments, once training with the softmax function has progressed to a level where a steady state is achieved, the social-networking system 160 may transition to a binary cross-entropy analysis, which may allow the social-networking system 160 to associate multiple descriptor n-grams at a time for an instance of a visual-media item. Although this disclosure focuses on generating embeddings for n-grams extracted from communications in a particular manner, it contemplates generating embeddings for n-grams extracted from any suitable source (e.g., titles, descriptions, or other sources that may be included in metadata of a visual-media item) in any suitable manner. More information on the use of triplet loss algorithms to associate n-grams with visual concepts or visual-media items may be found in the following paper, which is incorporated by reference: Armand Joulin et al., Learning Visual Features from Large Weakly Supervised Data, arXiv: 1511.02251, Nov. 6, 2015. Although this disclosure describes associating particular n-grams with particular concepts and particular media items in a particular manner, it contemplates associating any suitable n-grams or other information with any suitable concepts and items in any suitable manner In particular embodiments, the social-networking system 160 may continue training indefinitely and may continue to update the d-dimensional space accordingly with new embeddings, creating new n-gram associations in the process. As an example and not by way of limitation, the training may occur periodically (or as updates become necessary) to keep the social-networking system 160 updated. These updates may be beneficial as new n-grams come to represent existing visual concepts. As an example and not by way of limitation, new slang terms may develop to describe existing visual concepts, in which case the d-dimensional space may be updated to include n-embeddings for these visual concepts. As another example and not by way of limitation, n-grams for languages that may not yet have been indexed may begin to appear as the number of communications with visual-media items in those languages increase. The updates may also be beneficial in cases where new visual concepts develop. As an example and not by way of limitation, a visual concept describing a cellular phone may not have existed in visual-media items (or generally) before the advent of cellular phones. In this example, as visual-media items with segments depicting the visual concept corresponding to cell phones are uploaded and as the social-networking system 160 extracts n-grams associated with these visual-media items, the d-dimensional space may be updated and new n-gram associations may be made (e.g., equating the visual concept with the n-gram "cell phone").

In particular embodiments, the social-networking system 160 may associate, with the shared visual concept, one or more of the extracted n-grams that have embeddings within a threshold area of the v-embeddings for the identified visual-media items. The threshold area may describe an area associated with the shared visual concept. As an example and not by way of limitation, referencing FIG. 5, the threshold area 570 may correspond to a particular shared visual concept (e.g., referencing FIGS. 3A and 3B, the visual concept depicted in segments 320 and 340). In particular embodiments, the threshold area may be determined based on a threshold distance from a point in the d-dimensional space where the shared visual concept is estimated to be. As an example and not by way of limitation, referencing FIG. 5, the threshold area may be an area defined by a threshold distance from the point 580. The location of this point may be based on the location of v-embeddings of the visual-media items associated with the shared visual concept. As an example and not by way of limitation, the location of the point may be a modal point of the v-embeddings of the visual-media items associated with the shared visual concept (e.g., defined by averaging the coordinates of the v-embeddings of the visual-media items). The threshold area may be determined in any suitable manner. As an example and not by way of limitation, a Euclidean distance formula may be applied, where distance=$\sqrt{\Sigma_{i=1}^{d}(p_i-q_i)^2}$, and where p represents the coordinates of the point where a visual concept is estimated to be (e.g., referencing FIG. 5, the point 580) and q represents the coordinates of a point on an outer boundary, for dimensions i=1 to d. In this example, the distance may be set to a particular value, and the threshold area may be extrapolated from determining a plurality of points q that satisfy the equation.

In particular embodiments, the social-networking system 160 may populate a visual-concept index or an equivalent thereof that associates visual concepts with n-grams based on the joint embedding model. A visual concept in the visual-concept index may be indexed in a language-agnostic manner that relies on visual features associated with the visual concept and does not rely on text to define the visual concept. As an example and not by way of limitation, referencing FIGS. 3A and 3B, the visual concept depicted in the segments 320 and 340 may not be defined in the index by words like "cat" or "gato" (i.e., Spanish for "cat") and may instead be defined by the visual features of the segments such as the shape, texture, or color of the depiction of what may appear to a human as a cat in the visual-media items 310 and 330. One advantage of this language-agnostic definition is that such a definition is universal and does not require translating among languages to index visual-media items. Relatedly, this type of definition allows visual concepts to be associated with any term that is commonly associated with those visual concepts, including common misspellings (e.g., associating the n-gram "catt" with the visual concept that a human may recognize as a cat) and new slang (e.g., associating the slang term "whip" with a visual concept that a human may recognize as a car). In particular embodiments, rather than relying on text, a visual concept in the visual-concept index may be indexed by a corresponding visual concept identifier number, by corresponding data describing the properties of its respective d-dimensional vector or coordinates of its respective embedding, etc.

In particular embodiments, the social-networking system 160 may make use of the joint embedding model to identify visual-media items to return as search results in response to a search query for visual-media items. In the joint embedding training model, the locations of n-embeddings may be used to identify visual-media items responsive to a search query, based on the locations of the v-embeddings corresponding to the visual-media items. As an example and not by way of limitation, referencing FIG. 5, the n-embeddings 530 and 540 may be relatively close in proximity to the v-embeddings 510 and 520 (e.g., as determined by them being within the threshold area 570. This may indicate that a search query including the n-gram corresponding to the n-embedding 530 or the n-gram corresponding to the n-embedding 540 may be directed to a visual concept that is present in the visual-media items corresponding to the v-embeddings 510 and 520. This property of the joint-embedding model may be leveraged in executing search queries for visual-media items that include one or more of the n-grams having embeddings. When a user submits a search query, the social-networking system 160 may determine that the search query includes a particular n-gram for which there exists an n-embedding in the d-dimensional space. The social-networking system 160 may then return visual-media items with v-embeddings that are near the n-embedding of the particular descriptor n-gram in the embedding space (e.g., within a threshold distance of the v-embedding, within the threshold area associated with a visual concept within which both the n-embedding and the v-embedding are located). As an example and not by way of limitation, if the search query includes the descriptor n-gram "gato" (i.e., the Spanish equivalent of "cat"), which may correspond to an n-embedding close to v-embeddings of visual-media items that depict a visual concept that a human may recognize as a cat, the social-networking system 160 may return those visual-media items to the user. As another example and not by way of limitation, referencing FIG. 5, if the search query includes an n-gram corresponding to the n-embedding 540, the social-networking system 160 may return as search results one or more of the visual-media items whose embeddings are in the threshold area 570, which may be associated with a particular visual concept. In this example, the social-networking system 160 may return the visual-media items corresponding to the v-embeddings 510 and/or 520, among others. In particular embodiments, the social-networking system 160 may rank the search results based on the proximity of the v-embeddings of their respective visual-media items to an n-embedding of an n-gram in the search query. If the social-networking system 160 determines that a search query is directed to multiple visual concepts (e.g., the search query for "cat sitting by the window" may be directed to a visual concept that a human may recognize as a cat and a visual concept that a human may recognize as a window), the social-networking system 160 may further rank visual-media items based on proximity of their respective embeddings to the n-embeddings of the n-grams in the query directed to each of those visual concepts. In identifying and ranking responsive visual-media items, the social-networking system 160 may also consider other sources of information associated with the visual-media items (e.g., text from the title, description, a speech-recognition process, etc.). As another example and not by way of limitation, with respect to a search query for "grumpy cat," a visual-media item that is close in proximity to the n-embedding associated with the n-gram "cat" and also has in its title the n-grams "grumpy cat" may be ranked higher than a similar visual-media item that does not have those n-grams in its title. As an example and not by way of limitation, speech recognition may recognize the words "grumpy cat" being spoken by in a video and may correspondingly increase the rank of such video. Using the joint embedding model to execute queries for visual-media items may be quicker and more efficient, and may produce more high-quality results than other search methods, such as search methods that merely attempt to match n-grams of the search query with keywords associated with visual-media items.

In particular embodiments, the social-networking system 160 may segment a search query into one or more query-segments, each of which may include one or more n-grams of the search query. In particular embodiments, the social-networking system 160 may parse the text of the search query using one or more of the pre-processing steps described herein (e.g., a TF-IDF analysis that filters out insignificant terms from the search query). As an example and not by way of limitation, the social-networking system 160 may segment the search query "cat sitting by the window," into, among others, the following set of sequential n-grams: "cat" "cat sitting," "window." The social-networking system 160 may generate a reconstructed embedding of the search query based on one or more n-embeddings associated with one or more of the n-grams of the search query. A function $\vec{\Pi}$ may map an input to a reconstructed embedding of the input in an embedding space. In particular embodiments, the reconstructed embedding of the search query may be generated by pooling the one or more n-embeddings associated with the one or more of the n-grams of the search query, respectively. As an example and not by way of limitation, for a search query q comprising n-grams $n_1$ through $n_k$, $\vec{\Pi}(q)$ may be a pooling of the term embeddings for $n_1$ through $n_k$. In particular embodiments, the pooling may comprise one or more of a sum pooling, an average pooling, a weighted pooling, a pooling with temporal decay, a maximum pooling, or any other suitable pooling. As an example and not by way of limitation, the pooling may be a sum pooling, such that $\vec{\Pi}(q) = \sum_{i=1} \vec{\pi}(t_i)$. Building on the previous example and not by way of limitation, for the search query "cat sitting by the window," $\vec{\Pi}(q)$ may be calculated as $\vec{\Pi}(q) = \vec{\pi}(\text{"cat"}) + \vec{\pi}(\text{"cat sitting"}) + \vec{\pi}(\text{"window"}) + \ldots + \vec{\pi}(n_k)$. As another example and not by way of limitation, the pooling may be an average pooling, such that $$\Pi(q) = \frac{1}{k}\sum_{i=1}^{k} \vec{\pi}(n_i).$$

In particular embodiments, the social-networking system 160 may identify visual-media items responsive to the search query based on the location of the reconstructed embedding of the search query in the d-dimensional space with respect to the locations of the visual-media items in the d-dimensional space (e.g., based on proximity as determined by Euclidean distance calculations, based on cosine similarities of the respective vectors).

Figure 6:
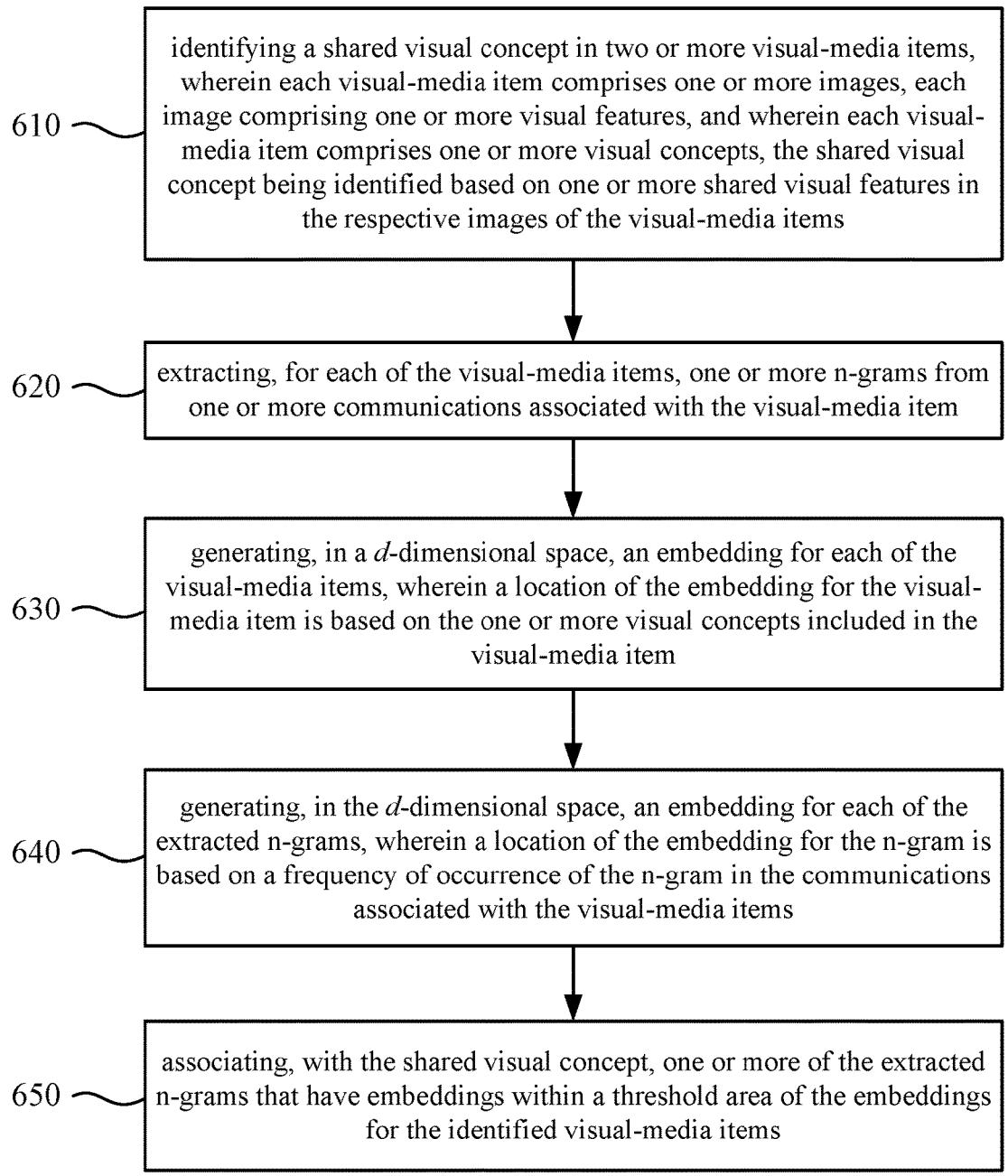
FIG. 6 illustrates an example method for associating n-grams with identified visual concepts.

FIG. 6 illustrates an example method 600 for associating n-grams with identified visual concepts. The method may begin at step 610, where the social-networking system 160 may identify a shared visual concept in two or more visual-media items, wherein each visual-media item comprises one or more images, each image comprising one or more visual features, and wherein each visual-media item comprises one or more visual concepts, the shared visual concept being identified based on one or more shared visual features in the respective images of the visual-media items. At step 620, the social-networking system 160 may extract, for each of the visual-media items, one or more n-grams from one or more communications associated with the visual-media item. At step 630, the social-networking system 160 may generate, in a d-dimensional space, an embedding for each of the visual-media items, wherein a location of the embedding for the visual-media item is based on the one or more visual concepts included in the visual-media item. At step 640, the social-networking system 160 may generate, in the d-dimensional space, an embedding for each of the extracted n-grams, wherein a location of the embedding for the n-gram is based on a frequency of occurrence of the n-gram in the communications associated with the visual-media items. At step 650, the social-networking system 160 may associate, with the shared visual concept, one or more of the extracted n-grams that have embeddings within a threshold area of the embeddings for the identified visual-media items. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for associating n-grams with identified visual concepts including the particular steps of the method of FIG. 6, this disclosure contemplates any suitable method for associating n-grams with identified visual concepts including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Training Image-Recognition Systems Based on Search Queries

The extensive and continuous nature of the training of n-grams to visual-media items and visual concepts as described herein may introduce several challenges for the social-networking system 160. First, the social-networking system 160 may only be able train for a finite number of visual concepts within a given period of time, such that the social-networking system 160 may be unable to be trained for every possible visual concept. Second, new visual concepts and n-grams describing them may constantly be emerging and the social-networking system 160 may need to be able to train for these visual concepts as they emerge and become important to the user base. As an example and not by way of limitation, the n-gram "smartphone" and its associated visual concept may not have existed before the first smartphone was released, such that the requisite associations may not have yet been trained for. The methods described herein attempt to solve problems such as these by using search-query metrics that describe what n-grams are popularly searched for, and by extension, what visual concepts are popularly searched for, to strategically select the visual concepts and n-grams to train for. The social-networking system 160 may use search-query metrics to determine what n-grams are popular in search queries submitted by users (e.g., n-grams used in a threshold number of queries) and may then train those n-grams to their respective visual concepts if they have not already been trained for. The social-networking system 160 may train these popular n-grams to their respective visual concepts using any suitable method such as the ones described here (e.g., by mapping these n-grams onto n-embeddings in the joint embedding model). As an example and not by way of limitation, if users are frequently submitting search queries that include the n-gram "batman" and if the social-networking system 160 has not associated that n-gram with a visual concept, the social-networking system 160 may select that n-gram for training. Selecting visual concepts and n-grams strategically in this manner may provide the technical benefit of improving the efficiency of training a visual-concept recognition system by training for visual concepts and n-grams that are relevant to a search functionality. It further ensures that the social-networking system 160 trains for the most up-to-date visual concepts.

In particular embodiments, the social-networking system 160 may receive, from a plurality of client systems 130 of a plurality of users, a plurality of search queries. Each of the search queries may include one or more n-grams. The social-networking system 160 may identify a subset of search queries from the plurality of search queries as being queries for visual-media items. The social-networking system 160 may determine that a search query is a query for visual-media items based on one or more n-grams of the search query being associated with visual-media content. The social-networking system 160 may calculate, for each of the n-grams of the search queries of the subset of search queries, a popularity-score. The popularity-score may be based on a count of the search queries in the subset of search queries that include the n-gram. The social-networking system 160 may determine one or more popular n-grams based on the n-grams of the search queries of the subset of search queries. The popular n-grams may be n-grams of the search queries of the subset of search queries having a popularity-score greater than a threshold popularity-score. The social-networking system 160 may select one or more of the popular n-grams for training a visual-concept recognition system. Each of these popular n-grams may be selected based on whether it is associated with one or more visual concepts. As an example and not by way of limitation, the social-networking system 160 may forgo the selection of a popular n-gram if it determines that the popular n-gram is already associated with one or more visual concepts.

In particular embodiments, the social-networking system 160 may receive, from a plurality of client systems 130 of a plurality of users, a plurality of search queries. The search queries may include may include one or more n-grams. In particular embodiments, one or more of the search queries may include one or more media items that may be associated with one or more n-grams, in which case, the social-networking system 160 may translate these media items into n-grams (i.e., the social-networking system 160 may treat the search query as though it included the n-grams associated with the image). As an example and not by way of limitation, a search query may include a visual-media item (e.g., an image in the case of an image search), and the social-networking system 160 may be able to recognize the image or visual concepts in the image (e.g., using an image-recognition system such as the one described herein). In this example, the social-networking system 160 may translate the image into its associated n-grams. As another example and not by way of limitation, the social-networking system 160 may be able to associate a media item (visual or otherwise) in a search query with n-grams that may be indexed with the media item in a media index (e.g., one that indexes videos, audio, images, etc. with associated n-grams), which may be populated as described in U.S. patent application Ser. No. 14/952,707, filed 25 Nov. 2015, which is incorporated by reference. In particular embodiments, the social-networking system 160 may extract one or more of the n-grams of each search query (or associated with the search query, e.g., based on media items in the search query). The social-networking system 160 may only extract certain n-grams, as described herein (e.g., after performing a TF-IDF analysis that filters out insignificant terms from the search query, after filtering out other n-grams that may be unlikely to describe visual concepts). Although this disclosure describes receiving particular search queries from particular systems in a particular manner, it contemplates receiving any suitable search queries from any suitable system in any suitable manner.

In particular embodiments, the social-networking system 160 may identify a subset of search queries from the plurality of search queries as being queries for visual-media items. In determining whether a particular search query is a query for visual-media items, the social-networking system 160 may effectively be making a prediction as the search intent of the user submitting the search query. In particular embodiments, the social-networking system 160 may perform this identification step as a means of narrowing down the search queries that need to be considered in determining the n-grams that need to be trained for using the visual-concept recognition system. By narrowing down the search queries to this subset of queries for visual-media items, the social-networking system 160 may filter out irrelevant metrics related to n-grams that may have nothing to do with visual concepts (e.g., because a user who is not searching for a visual-media item may not likely be describing a visual concept in the search query). This filtering may be advantageous because it may prevent erroneous data from influencing the determination of the popular n-grams to train for (e.g., by eliminating from consideration those n-grams that are unlikely to be directed to a visual concept) and because it may reduce the number of overall queries to process. The identification of the subset may be based on any suitable combination of one or more of the factors described herein. In particular embodiments, the social-networking system 160 may determine that a search query is a query for visual-media items if the search query is a bounded query, i.e., a search query that is specifically restricted to only return visual-media items. As an example and not by way of limitation, the user may select a filter or select an element from a dropdown menu that specifies that the search results should be visual-media items. In particular embodiments, the social-networking system 160 may determine that a search query is a query for visual-media items based on one or more n-grams of the search query being associated with visual-media content. As an example and not by way of limitation, the social-networking system 160 may determine that a search query is a query for a visual-media item if it includes n-grams such as "video," "photo," or "picture" that may explicitly indicate an intent to search for visual-media items. As another example and not by way of limitation, the social-networking system 160 may determine that a search query is a query for visual-media items if it includes n-grams that are commonly associated with visual-media items and therefore imply an intent to search for visual-media items (e.g., a search query for "beyonce single ladies" which may have a combination of n-grams commonly associated with a popular music video). In these examples, the social-networking system 160 may have a pre-generated list of such n-grams that it compares against the n-grams of search queries for this purpose. The pre-generated list may be curated and/or may be the product of a suitable machine-learning process that identifies n-grams associated with videos. In particular embodiments, the determination may be based on a search context from which the search query is submitted. As an example and not by way of limitation, if the search query is submitted from an interface that is dedicated to visual-media items, that may indicate a likelihood that the query is for visual-media items. In this example, a user may have submitted the search query from a video-search-results page or an image-search-results page, which may imply that the user may be interested in searching for visual-media items. As another example and not by way of limitation, if the search query is submitted from an interface that is otherwise associated with visual-media items, that may indicate a likelihood that the query is for visual-media items. In this example, a user may have submitted a search query from a page on the online social network that is associated with movie trailers, which may imply that the user may be interested in searching for visual-media items. In particular embodiments, the determination may be based on a results-set analysis, in which the search query may be executed on the back end to determine a number or a percentage of potential search results that are visual-media items. A sufficiently large number or percentage (e.g., one that is greater than a threshold value) of visual-media-item search results may indicate that the search query is likely a query for visual-media items. The results-set analysis may weight the number or percentage based on the relevance or quality of each visual-media-item search result. As an example and not by way of limitation, the results-set analysis may weight an occurrence of a visual-media-item search result that is of a relatively high relevance (e.g., as may be determined by the proximity of the embedding of the visual-media item to an embedding of the search query or embeddings of the n-grams of the search query) more highly than an occurrence of a less relevant visual-media-item search result. More information on performing a results-set analysis may be found in U.S. patent application Ser. No. 15/228,771, filed 4 Aug. 2016, which is incorporated by reference. In particular embodiments, the determination may be based on a number of times that prior searches including one or more n-grams of the search query resulted in a user (e.g., the user who submitted the search query) requesting to access a visual-media item. As an example and not by way of limitation, if a search query including the n-gram "james bond" often results in querying users submitting requests to view one or more visual-media items (e.g., by selecting an interactive element corresponding to a visual-media-item search result on a search-results interface presented to the querying user following the execution of the search query), that may indicate that the search query is likely a query for visual-media items. In particular embodiments, the determination may be based on information associated with the user submitting the search query. As an example and not by way of limitation, a search query from a user who submits search queries for videos relatively frequently may be more likely to be a query for a visual-media item than a search query from a user who does not submit queries for visual-media items as frequently. As another example and not by way of limitation, a search query submitted by a user who is of a demographic that submits search queries for visual-media items relatively frequently may be more likely to be a query for a visual-media item than a search query from a user who is of a demographic that does not submit queries for visual-media items as frequently. Although this disclosure describes identifying particular search queries in a particular manner, it contemplates identifying any suitable search queries in any suitable manner.

In particular embodiments, the social-networking system 160 may calculate, for each of the n-grams of the search queries of the subset of search queries, a popularity-score. The popularity-score of an n-gram may be an indication of the popularity of an n-gram as a search term in queries for visual-media items. In particular embodiments, the popularity-score of an n-gram may be based on a count of the search queries in the subset of search queries that include the n-gram. In particular embodiments, in calculating popularity-scores, the social-networking system 160 may weight the count of the search queries including the n-gram, weighting each occurrence of a search query based on a degree of confidence with which the search query is identified as being a query for visual-media items. The degree of confidence may be based on the manner in which the search query was identified as being a query for visual-media items. As an example and not by way of limitation, an occurrence of the n-gram "chewbacca mom" in the search query "chewbacca mom video" (e.g., determined to be a query for visual-media items based on the presence of the n-gram "video," which may be an explicit indication of an intent to search for visual-media items) may be weighted higher than an occurrence of the same n-gram in the search query "chewbacca mom in car" (e.g., determined to be a query for visual-media items based on the results set having a large percentage of visual-media-item search results). In particular embodiments, the weighting of the occurrences of an n-gram may also be based on information associated with the querying user (e.g., a user of a client system 130 from which the search query was received). As an example and not by way of limitation, the information may include demographic information of the querying user. For example, n-gram occurrences of search queries originating from users who are in the 18- to 29-year-old demographic may be weighted higher than search-term occurrences originating from users over 85 years old (e.g., because the former demographic may search for videos more than the latter demographic, as may be determined by search-query metrics). As another example and not by way of limitation, the information may include a level of engagement of the querying user on the online social network (e.g., as determined by a degree of usage of the online social network). For example, n-gram occurrences of search queries originating from users who have a relatively high engagement level on the social-networking system 160 may be weighted higher than n-gram occurrences in search queries originating from users who do not have as high of an engagement level. As another example and not by way of limitation, the information may include a search history of the querying user (e.g., a search history of the querying user on the online social network, which may be stored on the social-networking system 160 in associated with an account of the querying user). For example, n-gram occurrences of search queries originating from a querying user who submits search queries for visual-media items relatively frequently (e.g., on the online social network, on a third-party system) may be weighted higher than n-gram occurrences of search queries originating from a querying user who does not submit search queries for visual-media items as frequently. As another example and not by way of limitation, the information may include geo-location information of the user, and the geo-location information may be determined based on a geo-location of the client system 130 from which the search query is received. For example, n-gram occurrences of search queries submitted from a region where visual-media items are not commonly searched for may be weighted less than n-gram occurrences of search queries submitted from a region where visual-media items are more commonly searched. In particular embodiments, a search query may be determined to be a query for visual-media items based on any suitable combination of the factors described herein, and the weight of n-gram occurrences in these search queries may be adjusted accordingly in any suitable manner. The weighting of n-gram occurrences in determining the popularity-score of an n-gram may be represented by the following simplified equation: popularity-score=$f_s(f_1(An_1)+f_2(Bn_2)+ \ldots )$, where $f_s$ is a scaling function, $f_1$ is a function applied to a number of n-gram occurrences $n_1$ of search queries determined to be queries for visual-media items in a first particular manner, $f_2$ is a function applied to a number n-gram occurrences $n_2$ of search queries determined to be queries for visual-media items in a second particular manner, and A and B are respective weights. In particular embodiments, an entity may request or pay for an increase in one or more popularity-scores that are of interest. As an example and not by way of limitation, Acme LLC, a startup company, may pay for an increase in popularity-scores associated with the n-grams "acme" or "acme llc" so that these n-grams may be more quickly associated with a suitable visual concept (e.g., a trailer of an Acme LLC company logo, if in fact there are sufficient communications including these n-grams and associated with visual-media items including that logo). Although this disclosure describes calculating particular scores for particular n-grams in a particular manner, it contemplates calculating any suitable scores for any suitable search units in any suitable manner.

In particular embodiments, the social-networking system 160 may determine that one or more n-grams are popular n-grams based on the n-grams of the search queries of the subset of search queries. In particular embodiments, the popular n-grams may be n-grams of the search queries of the subset of search queries having a popularity-score greater than a threshold popularity-score. In particular embodiments, the threshold popularity-score may be a threshold rank. As an example and not by way of limitation, at any point, only the n-grams with the top twenty popularity-scores may be determined to be popular n-grams. Although this disclosure describes determining particular n-grams in a particular manner, it contemplates determining any suitable n-grams (or other search units) in any suitable manner.

In particular embodiments, the social-networking system 160 may select one or more of the popular n-grams for training a visual-concept recognition system (or prioritize the training of such n-grams among a list of n-grams selected for training). As described herein, a popular n-gram of a search query that is likely to be a query for visual-media items may tend to be a descriptor of a visual concept (e.g., simply based on the fact that users may tend to construct search queries for visual-media items by describing visual concepts within the visual-media item). Each of these popular n-grams may be selected based on whether it is associated with one or more visual concepts. As an example and not by way of limitation, if the social-networking system 160 calculates a relatively high popularity-score for the n-gram "mountain" (e.g., based on a relatively high count of search queries including the n-gram "mountain"), and further determines that the n-gram "mountain" is not associated with a visual concept (e.g., based on the n-embedding of the n-gram not being within a threshold area of any particular visual concept), the social-networking system 160 may focus on training the visual-concept recognition system for the n-gram "mountain." In particular embodiments, the social-networking system 160 may forgo the selection of a popular n-gram if it determines that the popular n-gram is already associated with one or more visual concepts. As an example and not by way of limitation, an n-gram may be associated with a visual concept if it has an n-embedding in the d-dimensional space that is within a threshold area associated with a visual concept. In this example, referencing FIG. 5, the n-embeddings 530 and 540 may be associated with the visual concept associated with the threshold area 570. In particular embodiments, the social-networking system 160 may only forgo the selection of a popular n-gram if it determines that the popular n-gram is sufficiently associated with a visual concept. In these embodiments, there may need to be a threshold degree of association between a popular n-gram and a visual concept before the social-networking system 160 forgoes selection of the popular n-gram. This threshold degree may be a threshold distance from the location of a point on the d-dimensional space where a visual concept is estimated to be. As an example and not by way of limitation, referencing FIG. 5, the n-embedding 530 may be sufficiently associated with the visual concept corresponding to the point 580 (because it may be within the threshold distance from the point 580), but the n-embedding 540 may not be sufficiently associated with the same visual concept even though it is within the threshold area (because it may not be within the threshold distance from the point 580). In particular embodiments, the social-networking system 160 may only forgo such selection if the popular n-gram is associated with a threshold number of visual concepts (e.g., three visual concepts). Although this disclosure describes selecting for training particular n-grams in a particular manner, it contemplates selecting for training any suitable n-grams (or other search units) in any suitable manner.

In particular embodiments, the social-networking system 160 may select specific visual concepts for training the visual-concept recognition system. In particular embodiments, specific visual concepts may be selected based on whether the specific visual concepts are sufficiently represented by n-grams. As an example and not by way of limitation, the social-networking system 160 may determine whether a specific visual concept is sufficiently represented based on the number of n-embeddings in the joint embedding space that are within a threshold area of the specific visual concept. In particular embodiments, the determination as to whether a visual concept and its descriptor n-grams are sufficiently represented may be based on distribution data reflecting the percentage of visual-media items on the social-networking system 160 that include or are expected to include a visual concept. In particular embodiments, the social-networking system 160 may access distribution data that classifies visual-media items in a sample set as including one or more categories of visual concepts (e.g., using a supervised learning system). The social-networking system 160 may estimate, based on the distribution data, projected frequencies for each of the one or more categories of visual concepts in a larger set of visual-media items, wherein each projected frequency describes a number of visual-media items in the larger set that are predicted to include one or more visual concepts of the respective category of visual concepts. As an example and not by way of limitation, if 20% of visual-media items in the sample set are determined to include a visual concept in the category "Food Items," the social-networking system 160 may estimate a projected frequency of 20% for this category in the larger set, such that it may be expected that about 20% of visual-media items in the larger set include a visual concept in the category "Food Items." The social-networking system 160 may then determine based on the projected frequencies whether there exists a representative number of n-gram associations with each category. Building on the previous example and not by way of limitation, the social-networking system 160 may determine whether there is a representative number of n-gram associations with visual concepts of the category "Food Items" based on the projected frequency of 20%. If there is not a representative number of such associations, the social-networking system 160 may focus on training for visual concepts related to this category. In particular embodiments, the social-networking system 160 may use a supervised training process to train for specific visual concepts or categories of visual concepts. The supervised training process may include the use of human reviewers to manually train visual concepts (e.g., by associating the visual concepts with one or more appropriate n-grams). As an example and not by way of limitation, the social-networking system 160 may use a human reviewer to train the social-networking system 160 on what the visual concept for "mountain" may look like (e.g., by associating the n-gram "mountain" with one or more visual-media items depicting what a human would recognize as a mountain).

In particular embodiments, the social-networking system 160 may employ a supervised training process that uses human evaluators to check whether n-grams associated with visual concepts correctly describes the respective visual concepts and/or whether visual-media items associated with a visual concept correctly includes that visual concept. In particular embodiments, a similar supervised training process may determine whether it is even possible for particular segments (incorrectly) identified as visual concepts are actually visual concepts. As an example and not by way of limitation, the social-networking system 160 may (incorrectly) identify a segment in an image that a human would not recognize as any visual concept. In this example, a human evaluator may determine that the segment does not depict a visual concept and may, for example, remove n-gram associations with the segment. In particular embodiments, a similar supervised learning process may determine that certain visual concepts, even though they may be recognizable as a visual concept, are simply unlikely to ever be discussed in a communication (or described in metadata such as titles or descriptions) and similarly may be unlikely to be searched for as a visual concept in a search query for visual-media items. In particular embodiments, a similar supervised training process may determine whether one or more visual concepts are even capable of being described by n-grams. In particular embodiments, a similar supervised training process may determine whether particular n-grams can correctly be associated with visual concepts. As an example and not by way of limitation, the n-gram "nothing" may frequently appear in communications including visual-media items that depict a particular visual concept, but a human evaluator may determine that there is no visual concept that can correctly be associated with "nothing" (i.e., that a human would not recognize a visual concept as a depiction of "nothing"). The supervised training process may, as an alternative to or in addition to human evaluators, use a suitable index (e.g., a media-index, a text-index, etc.) to make these determinations. As an example and not by way of limitation, the social-networking system 160 may match the n-gram "cat" against a text-index that indexes text to social-graph concepts to determine that it relates to the social-graph concept "Cat," which may allow the social-networking system 160 to check a visual concept associated with the n-gram "cat" against images indexed (e.g., on the online social network, on a third-party database) with the social-graph concept "Cat." Similar to the previous example and not by way of limitation, the social-networking system 160 may identify a visual concept in a visual-media item of what a human would recognize as a cat and match it against a media-index that indexes media items to concepts to determine that it relates to the social-graph concept "Cat." The supervised training process may also use other metrics such as click-through rate to determine if an n-gram has been properly trained with respect to a visual concept. As an example and not by way of limitation, if querying users who submitted a search query including the n-gram "yeezy" frequently click on music videos or photos of the artist Kanye West, the social-networking system 160 may determine that a current association of "yeezy" to a visual concept associated with Kanye West is correct. In particular embodiments, the social-networking system 160 may check the associations between an n-gram and a particular visual concept based on whether querying users who submit search queries including the n-gram subsequently request to access a visual-media item including the particular visual concept. As an example and not by way of limitation, the social-networking system 160 may determine the number of times querying users request to view the visual-media item, which may have been sent to the querying users (e.g., as a search result corresponding to the visual-media item on a search results interface).

In particular embodiments, the social-networking system 160 may update associations between n-grams and visual concepts. The updates may occur periodically or may occur as necessary (e.g., when it is determined that a threshold number of n-grams are being used a threshold number of times in communications associated with visual-media items having visual concepts with which the n-grams as yet have no association). In particular embodiments, the social-networking system 160 may introduce new visual concepts, or n-grams, and/or remove existing ones from a total set of visual concepts, or n-grams, that have been trained. This may ensure that the social-networking system 160 remains trained on visual concepts and n-grams that people are currently searching for, without resources being wasted on unnecessary visual concepts and n-grams. In particular embodiments, whenever a difference in visual concepts or n-grams to train for has been made and propagated (e.g., when a new visual concept or n-gram is introduced, when an existing visual concept or n-gram is removed), new associations may be made between visual-media items and n-grams using the visual-concept recognition system. The new associations may be made either selectively (based on popularity or recency of the visual-media items or n-grams) or completely (for all visual-media items and n-grams).

Figure 7:
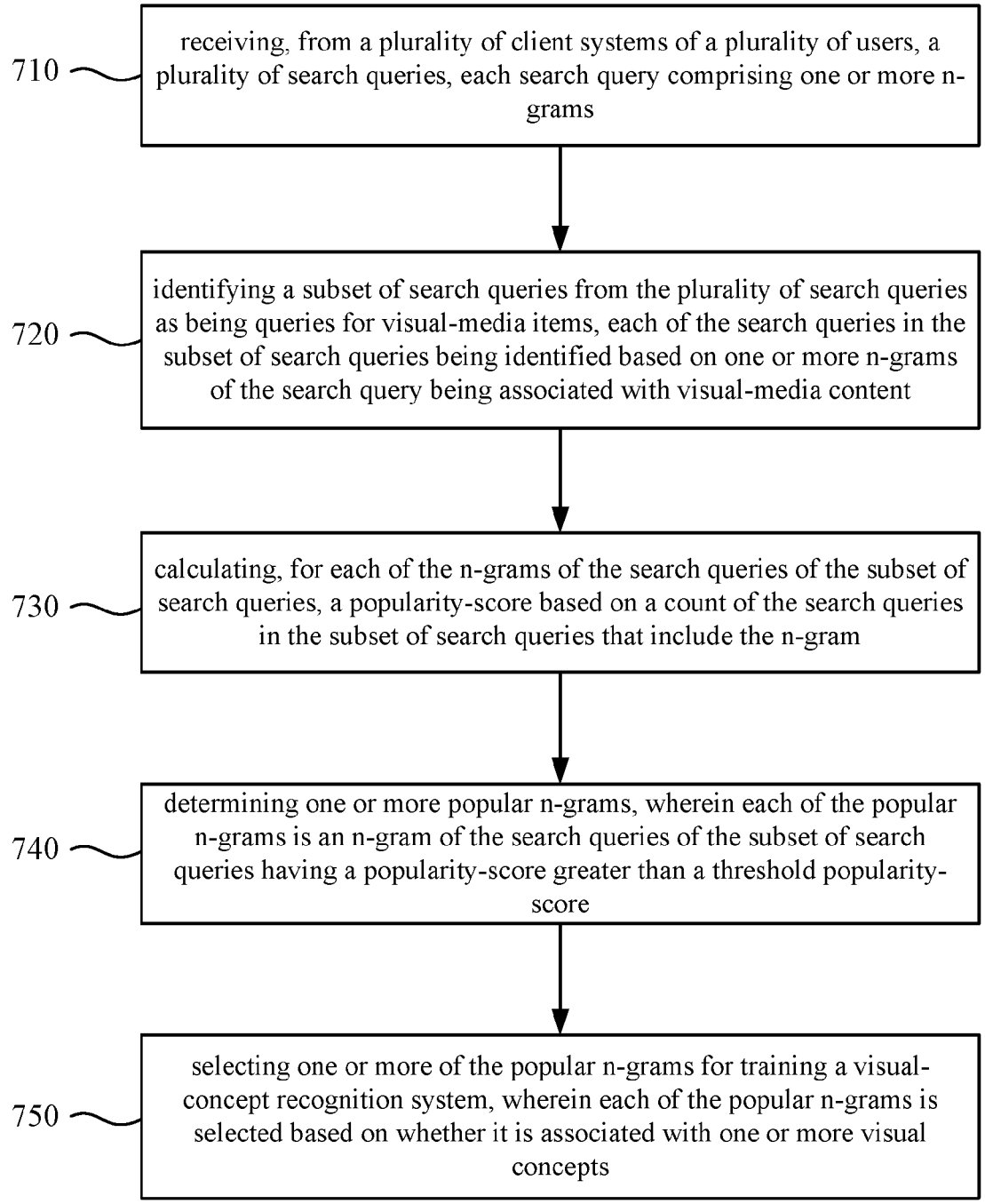
FIG. 7 illustrates an example method for selecting n-grams for training a visual-concept recognition system.

FIG. 7 illustrates an example method 700 for selecting n-grams for training a visual-concept recognition system. The method may begin at step 710, where the social-networking system 160 may receive, from a plurality of client systems 130 of a plurality of users, a plurality of search queries, each search query comprising one or more n-grams. At step 720, the social-networking system 160 may identify a subset of search queries from the plurality of search queries as being queries for visual-media items, each of the search queries in the subset of search queries being identified based on one or more n-grams of the search query being associated with visual-media content. At step 730, the social-networking system 160 may calculate, for each of the n-grams of the search queries of the subset of search queries, a popularity-score based on a count of the search queries in the subset of search queries that include the n-gram. At step 740, the social-networking system 160 may determine one or more popular n-gram, wherein each of the popular n-grams is an n-gram of the search queries of the subset of search queries having a popularity-score greater than a threshold popularity-score. At step 750, the social-networking system 160 may select one or more of the popular n-grams for training a visual-concept recognition system, wherein each of the popular n-grams is selected based on whether it is associated with one or more visual concepts. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for selecting n-grams for training a visual-concept recognition system including the particular steps of the method of FIG. 7, this disclosure contemplates any suitable method for selecting n-grams for training a visual-concept recognition system including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Systems and Methods

Figure 8:
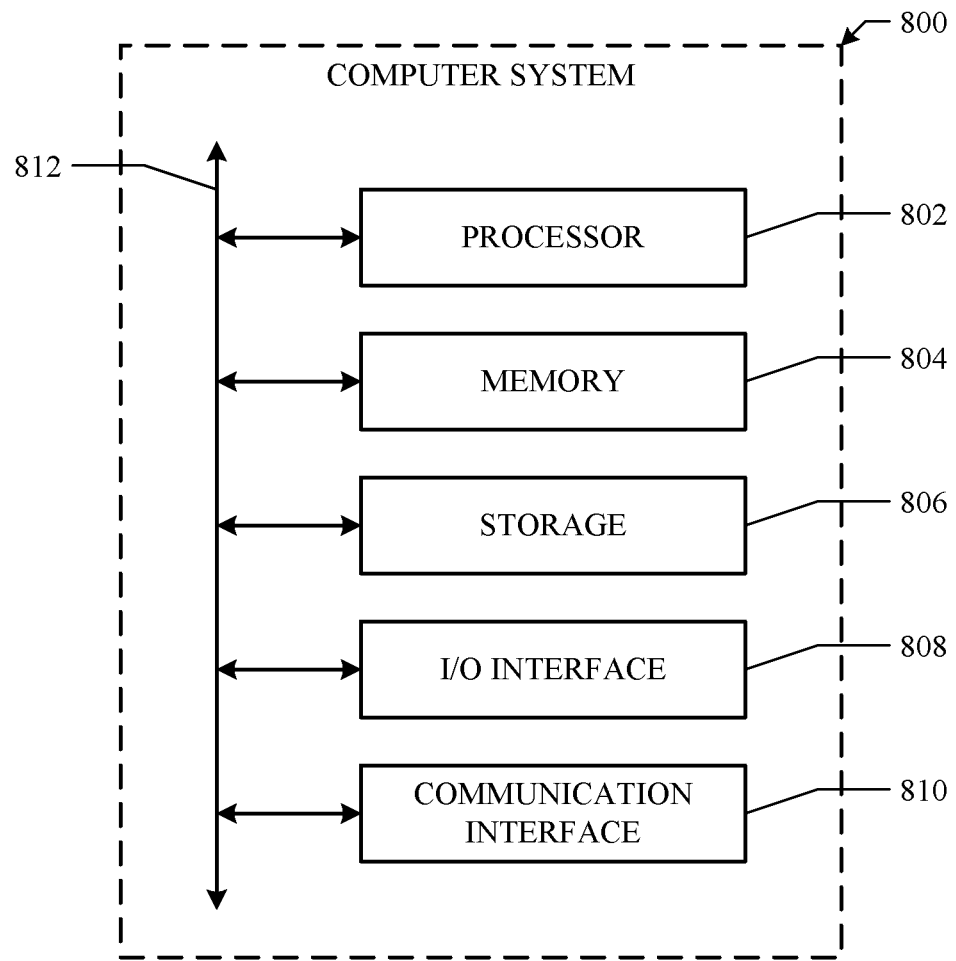
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising, by one or more computing systems:
   receiving, from a plurality of client systems of a plurality of users, a plurality of search queries, each search query comprising one or more n-grams;
   identifying a subset of search queries from the plurality of search queries as being queries for visual-media items, each of the search queries in the subset of search queries being identified based on one or more n-grams of the search query being associated with visual-media content;
   calculating, for each of the n-grams of the search queries of the subset of search queries, a popularity-score based on a count of the search queries in the subset of search queries that include the n-gram, wherein,
     for each of one or more of the n-grams of the search queries of the subset of search queries, the count of the search queries including the n-gram is a weighted count that weights an occurrence of each search query based on a degree of confidence with which the search query is identified as being a query for visual-media items;
   determining one or more popular n-grams, wherein each of the popular n-grams is an n-gram of the search queries of the subset of search queries having a popularity-score greater than a threshold popularity-score; and
   selecting one or more of the popular n-grams for training a visual-concept recognition system, wherein each of the popular n-grams is selected based on whether it is associated with one or more visual concepts.

2. The method of claim 1, further comprising:
   accessing a social graph comprising a plurality of nodes and a plurality of edges connecting the nodes, each of the edges between two of the nodes representing a single degree of separation between them, the nodes comprising:
     a first node corresponding to a user associated with an online social network; and
     a plurality of second nodes that each correspond to a visual-media item or a visual concept associated with the online social network.

3. The method of claim 1, wherein each of one or more of the search queries in the subset of search queries is further identified based on a number of visual-media items that match the search query.

4. The method of claim 1, wherein each of one or more of the search queries in the subset of search queries is further identified based on a number of times that prior searches including one or more n-grams of the search query resulted in a user requesting to access a visual-media item.

5. The method of claim 1, wherein each of one or more of the search queries in the subset of search queries is further identified based on whether it is a bounded search query that specifically filters for search results having visual-media content.

6. The method of claim 1, wherein each of one or more of the search queries in the subset of search queries is further identified based on a search context from which the search query is submitted.

7. The method of claim 1, wherein the weighted count further weights the occurrence of each search query based on information associated with a user of a client system from which the search query was received.

8. The method of claim 7, wherein the information associated with the user comprises demographic information of the user.

9. The method of claim 7, wherein the information associated with the user comprises geo-location information of the user, the geo-location information being determined based on a geo-location of the client system from which the search query is received.

10. The method of claim 7, wherein the information associated with the user comprises a search history of the user.

11. The method of claim 1, further comprising determining whether each of the popular n-grams is associated with a particular visual concept based on an analysis of a joint-embedding model, the analysis comprising, for each of the popular n-grams:
   determining if an embedding for the popular n-gram is within a threshold area of embeddings for one or more visual-media items that include the particular visual concept.

12. The method of claim 1, further comprising selecting one or more visual concepts for training the visual-concept recognition system, wherein the selecting comprises:
   accessing distribution data that classifies visual-media items in a sample set as including one or more categories of visual concepts;
   estimating, based on the distribution data, projected frequencies for each of the one or more categories of visual concepts in a larger set of visual-media items, wherein each projected frequency describes a frequency of occurrence of the respective category of visual concepts in the larger set that are predicted to include one or more visual concepts of the respective category of visual concepts; and
   determining, based on the projected frequencies, whether there exists a representative number of n-gram associations with one or more visual concepts of each category of visual concepts.

13. The method of claim 12, further comprising receiving inputs from one or more human evaluators specifying whether or not each of one or more of the visual concepts is capable of being described by n-grams.

14. The method of claim 1, further comprising using a supervised training process to train the popular n-grams selected for training the visual-concept recognition system, wherein the supervised training process comprises receiving inputs from one or more human evaluators associating the popular n-grams with one or more visual concepts.

15. The method of claim 1, further comprising:
   receiving, from a client system of a particular user, a search query comprising one or more n-grams that are associated with a particular visual concept;
   sending, to the client system of the particular user, one or more visual-media items that include the particular visual concept; and
   determining whether the client system of the particular user subsequently requests to access one or more of the visual-media items that include the particular visual concept.

16. The method of claim 1, further comprising, for one or more n-grams, periodically updating the respective associations with visual concepts.

17. One or more computer-readable non-transitory storage media embodying software that is operable when executed to:
   receive, from a plurality of client systems of a plurality of users, a plurality of search queries, each search query comprising one or more n-grams;
   identify a subset of search queries from the plurality of search queries as being queries for visual-media items, each of the search queries in the subset of search queries being identified based on one or more n-grams of the search query being associated with visual-media content;
   calculate, for each of the n-grams of the search queries of the subset of search queries, a popularity-score based on a count of the search queries in the subset of search queries that include the n-gram, wherein,
      for each of one or more of the n-grams of the search queries of the subset of search queries, the count of the search queries including the n-gram is a weighted count that weights an occurrence of each search query based on a degree of confidence with which the search query is identified as being a query for visual-media items;
   determine one or more popular n-gram, wherein each of the popular n-grams is an n-gram of the search queries of the subset of search queries having a popularity-score greater than a threshold popularity-score; and
   select one or more of the popular n-grams for training a visual-concept recognition system, wherein each of the popular n-grams is selected based on whether it is associated with one or more visual concepts.

18. The media of claim 17, further comprising determining whether each of the popular n-grams is associated with a particular visual concept based on an analysis of a joint-embedding model, the analysis comprising, for each of the popular n-grams:
   determining if an embedding for the popular n-gram is within a threshold area of embeddings for one or more visual-media items that include the particular visual concept.

19. A system comprising: one or more processors; and a non-transitory memory coupled to the processors comprising instructions executable by the processors, the processors operable when executing the instructions to:
   receive, from a plurality of client systems of a plurality of users, a plurality of search queries, each search query comprising one or more n-grams;
   identify a subset of search queries from the plurality of search queries as being queries for visual-media items, each of the search queries in the subset of search queries being identified based on one or more n-grams of the search query being associated with visual-media content;
   calculate, for each of the n-grams of the search queries of the subset of search queries, a popularity-score based on a count of the search queries in the subset of search queries that include the n-gram, wherein,
      for each of one or more of the n-grams of the search queries of the subset of search queries, the count of the search queries including the n-gram is a weighted count that weights an occurrence of each search query based on a degree of confidence with which the search query is identified as being a query for visual-media items;

determine one or more popular n-gram, wherein each of the popular n-grams is an n-gram of the search queries of the subset of search queries having a popularity-score greater than a threshold popularity-score; and select one or more of the popular n-grams for training a visual-concept recognition system, wherein each of the popular n-grams is selected based on whether it is associated with one or more visual concepts.

20. The media of claim 17, wherein the weighted count further weights the occurrence of each search query based on information associated with a user of a client system from which the search query was received.

* * * * *